United States Patent
Zhou et al.

(10) Patent No.: US 11,743,000 B2
(45) Date of Patent: Aug. 29, 2023

(54) FEEDBACK-BASED RETRANSMISSION OF BROADCAST NETWORK CODING ENCODED PACKETS

(71) Applicant: QUALCOMM Incorporated, San Diego, CA (US)

(72) Inventors: Shanyu Zhou, San Diego, CA (US); Jelena Damnjanovic, Del Mar, CA (US); Tao Luo, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 6 days.

(21) Appl. No.: 17/340,642

(22) Filed: Jun. 7, 2021

(65) Prior Publication Data

US 2022/0014318 A1   Jan. 13, 2022

Related U.S. Application Data

(60) Provisional application No. 63/049,445, filed on Jul. 8, 2020.

(51) Int. Cl.
*H04L 1/18* (2023.01)
*H04B 7/06* (2006.01)
(Continued)

(52) U.S. Cl.
CPC ......... *H04L 1/1896* (2013.01); *H04B 7/0626* (2013.01); *H04L 1/0005* (2013.01)

(58) Field of Classification Search
None
See application file for complete search history.

(56) References Cited

U.S. PATENT DOCUMENTS

| 7,924,761 B1 | 4/2011 | Stevens |
| 2011/0141961 A1* | 6/2011 | Lor .......................... H04H 20/72 370/312 |
| 2021/0400631 A1 | 12/2021 | Zhou et al. |

FOREIGN PATENT DOCUMENTS

WO   WO-2011113200 A1 *   9/2011   ........... H04L 1/1887

OTHER PUBLICATIONS

Partial International Search Report—PCT/US2021/036399—ISA/EPO—dated Sep. 23, 2021.
(Continued)

*Primary Examiner* — Peter Chen
*Assistant Examiner* — Jeff Banthrongsack
(74) *Attorney, Agent, or Firm* — Harrity & Harrity LLP / Qualcomm

(57) ABSTRACT

Various aspects of the present disclosure generally relate to wireless communication. In some aspects, a transmitter may broadcast a first set of network coding encoded packets for reception by a plurality of receivers, and receive feedback information associated with the first set of network coding encoded packets, the feedback information indicating that one or more receivers of the plurality of receivers did not successfully receive a quantity of network coding encoded packets that satisfies a decoding threshold associated with recovering the plurality of source packets, and a first subset of network coding encoded packets of the first set of network coding encoded packets that were not successfully received by at least one receiver. The transmitter may broadcast a second set of network coding encoded packets. The second set of network coding encoded packets may include at least the first subset of network coding encoded packets. Numerous other aspects are provided.

30 Claims, 8 Drawing Sheets

(51) Int. Cl.
*H04L 1/00* (2006.01)
*H04L 1/1867* (2023.01)

(56) References Cited

OTHER PUBLICATIONS

International Search Report and Written Opinion—PCT/US2021/036399—ISA/EPO—dated Nov. 15, 2021.

\* cited by examiner

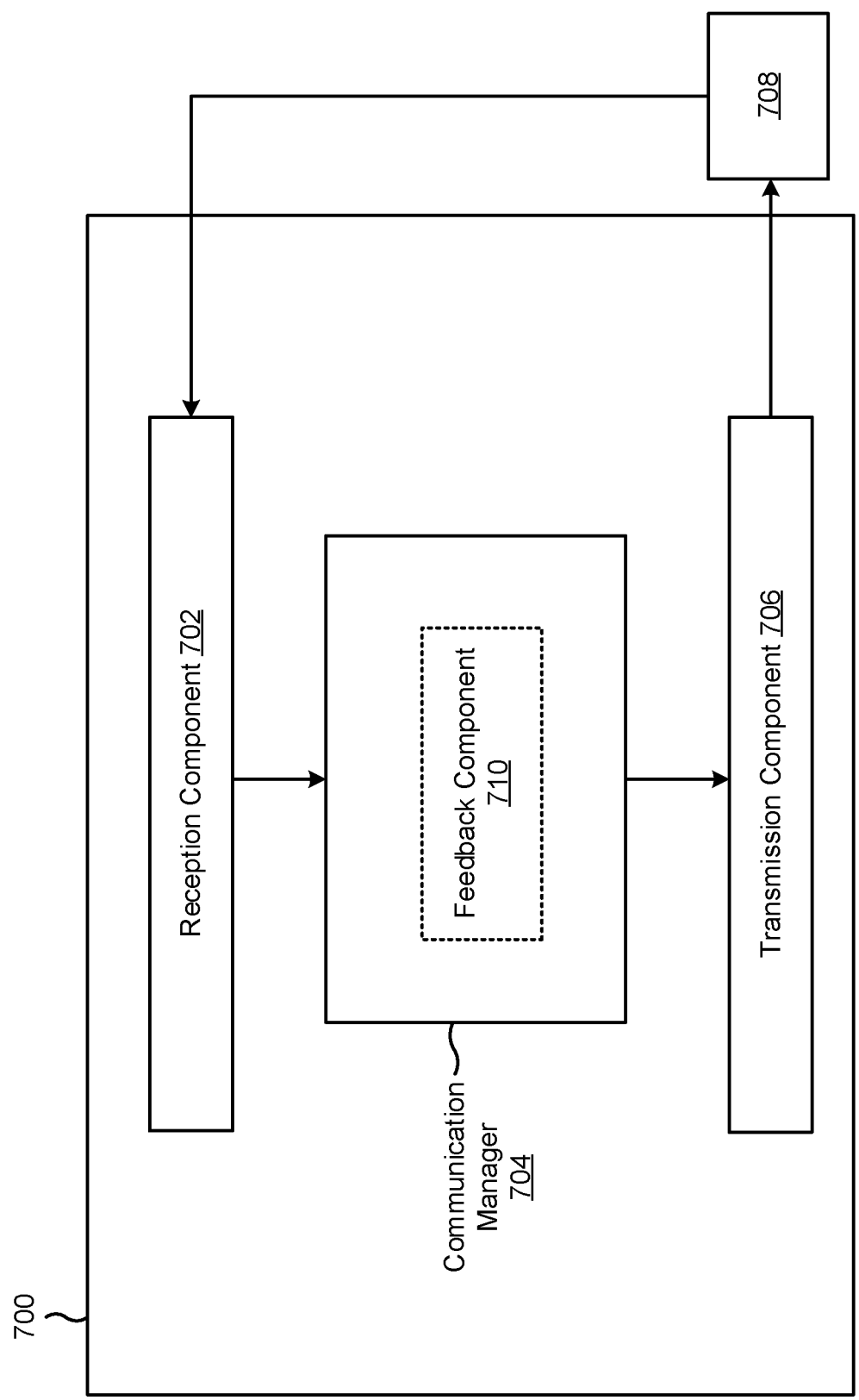

FEEDBACK-BASED RETRANSMISSION OF BROADCAST NETWORK CODING ENCODED PACKETS

CROSS-REFERENCE TO RELATED APPLICATION

This Patent Application claims priority to U.S. Provisional Patent Application No. 63/049,445, filed on Jul. 8, 2020, entitled "FEEDBACK-BASED RETRANSMISSION OF BROADCAST NETWORK CODING ENCODED PACKETS," and assigned to the assignee hereof. The disclosure of the prior Application is considered part of and is incorporated by reference into this Patent Application.

FIELD OF THE DISCLOSURE

Aspects of the present disclosure generally relate to wireless communication and specifically, to techniques and apparatuses for feedback-based retransmission of broadcasted network coding encoded packets.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (for example, bandwidth or transmit power). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

The above multiple access technologies have been adopted in various telecommunication standards to provide a common protocol that enables different user equipments (UEs) to communicate on a municipal, national, regional, and even global level. New Radio (NR), which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM or SC-FDMA (for example, also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements are applicable to other multiple access technologies and the telecommunication standards that employ these technologies.

A transmitter (such as a base station or a UE) may transmit the same group of source packets to multiple receivers (including one or more UEs or one or more base stations). In some deployments, the transmitter may be configured to transmit the group of source packets to the multiple receivers via broadcast transmission(s) that use a network coding technique. In accordance with a conventional network coding technique, the transmitter may generate a first set of network coding encoded packets from the group of source packets and broadcast the first set of network coding encoded packets for reception by the multiple receivers. The transmitter may generate a second set of network coding encoded packets from the same group of source packets and broadcast the second set of network coding encoded packets for reception by the multiple receivers. In accordance with the conventional network coding technique used in the broadcast scenario, feedback information associated with the first set of network coding encoded packets is not provided by any of the multiple receivers and, therefore, the transmitter may not rely on feedback information when generating or broadcasting the second set of network coding encoded packets (for example, because the transmitter is unaware of a source packet recovery/decoding status at a given receiver). The transmitter may repeat this process (for example, for a particular amount of time or for a particular quantity of iterations) to improve the likelihood that all of the receivers successfully recover all of the source packets. However, the lack of feedback information utilization can result in wasted network resources, wasted resources (for example, power resources or processing resources) at the transmitter or the multiple receivers, a reduction in overall network efficiency, and a duplication of source packets at a given receiver, among other examples.

SUMMARY

In some aspects, a method of wireless communication performed by a transmitter includes generating a plurality of source packets; performing an encoding operation on the plurality of source packets that generates a first set of network coding encoded packets. The method further includes broadcasting the first set of network coding encoded packets for reception by a plurality of receivers. The method further includes receiving, from the plurality of receivers, feedback information associated with the first set of network coding encoded packets, the feedback information indicating that one or more receivers of the plurality of receivers did not successfully receive a quantity of network coding encoded packets that satisfies a decoding threshold associated with recovering the plurality of source packets, the feedback information further indicating a first subset of network coding encoded packets of the first set of network coding encoded packets that were not successfully received by at least one receiver of the plurality of receivers. The method further includes broadcasting a second set of network coding encoded packets for reception by at least the one or more receivers based on the feedback information indicating that the one or more receivers did not receive the quantity of network coding encoded packets that satisfies the decoding threshold, the second set of network coding encoded packets including at least the first subset of network coding encoded packets that were not successfully received by at least one receiver of the plurality of receivers.

In some aspects, a method of wireless communication performed by a receiver includes receiving a first subset of network coding encoded packets of a first set of network coding encoded packets broadcast for reception by a plurality of receivers including the receiver, the first set of network coding encoded packets being based on a first encoding operation performed on a plurality of source packets. The method further includes failing to receive a second subset of network coding encoded packets of the first set of network coding encoded packets. The method further includes transmitting feedback information associated with the second subset of network coding encoded packets, the feedback information including channel state information (CSI) report information to be used in association with selecting a modulation and coding scheme (MCS), and the feedback information not including information associated with the first subset of network coding encoded packets.

In some aspects, a transmitter for wireless communication includes at least one processor and at least one memory communicatively coupled with the at least one processor and storing processor-readable code that, when executed by the at least one processor, is configured to cause the transmitter to generate a plurality of source packets. In some aspects, the processor-readable code, when executed by the at least one processor, is configured to cause the transmitter to perform an encoding operation on the plurality of source packets that generates a first set of network coding encoded packets. In some aspects, the processor-readable code, when executed by the at least one processor, is configured to cause the transmitter to broadcast the first set of network coding encoded packets for reception by a plurality of receivers. In some aspects, the processor-readable code, when executed by the at least one processor, is configured to cause the transmitter to receive, from the plurality of receivers, feedback information associated with the first set of network coding encoded packets, the feedback information indicating that one or more receivers of the plurality of receivers did not successfully receive a quantity of network coding encoded packets that satisfies a decoding threshold associated with recovering the plurality of source packets, the feedback information further indicating a first subset of network coding encoded packets of the first set of network coding encoded packets that were not successfully received by at least one receiver of the plurality of receivers. In some aspects, the processor-readable code, when executed by the at least one processor, is configured to cause the transmitter to broadcast a second set of network coding encoded packets for reception by at least the one or more receivers based on the feedback information indicating that the one or more receivers did not receive the quantity of network coding encoded packets that satisfies the decoding threshold, the second set of network coding encoded packets including at least the first subset of network coding encoded packets that were not successfully received by at least one receiver of the plurality of receivers.

In some aspects, a receiver for wireless communication includes at least one processor and at least one memory communicatively coupled with the at least one processor and storing processor-readable code that, when executed by the at least one processor, is configured to cause the receiver to receive a first subset of network coding encoded packets of a first set of network coding encoded packets broadcast for reception by a plurality of receivers including the receiver, the first set of network coding encoded packets being based on a first encoding operation performed on a plurality of source packets. The processor-readable code, when executed by the at least one processor, is configured to cause the receiver to transmit feedback information associated with a second subset of network coding encoded packets of the first set of network coding encoded packets not received by the receiver, the feedback information including CSI report information to be used in association with selecting an MCS, and the feedback information not including information associated with the first subset of network coding encoded packets.

In some aspects, a non-transitory computer-readable medium storing one or more instructions for wireless communication includes: one or more instructions that, when executed by one or more processors of a transmitter, cause the one or more processors to generate a plurality of source packets. The one or more instructions cause the one or more processors to perform an encoding operation on the plurality of source packets that generates a first set of network coding encoded packets. The one or more instructions cause the one or more processors to broadcast the first set of network coding encoded packets for reception by a plurality of receivers. The one or more instructions cause the one or more processors to receive, from the plurality of receivers, feedback information associated with the first set of network coding encoded packets, the feedback information indicating that one or more receivers of the plurality of receivers did not successfully receive a quantity of network coding encoded packets that satisfies a decoding threshold associated with recovering the plurality of source packets, the feedback information further indicating a first subset of network coding encoded packets of the first set of network coding encoded packets that were not successfully received by at least one receiver of the plurality of receivers. The one or more instructions cause the one or more processors to broadcast a second set of network coding encoded packets for reception by at least the one or more receivers based on the feedback information indicating that the one or more receivers did not receive the quantity of network coding encoded packets that satisfies the decoding threshold, the second set of network coding encoded packets including at least the first subset of network coding encoded packets that were not successfully received by at least one receiver of the plurality of receivers.

In some aspects, a non-transitory computer-readable medium storing one or more instructions for wireless communication includes one or more instructions that, when executed by one or more processors of a receiver, cause the one or more processors to receive a first subset of network coding encoded packets of a first set of network coding encoded packets broadcast for reception by a plurality of receivers including the receiver, the first set of network coding encoded packets being based on a first encoding operation performed on a plurality of source packets. The one or more instructions cause the one or more processors to and transmit feedback information associated with a second subset of network coding encoded packets of the first set of network coding encoded packets not received by the receiver, the feedback information including CSI report information to be used in association with selecting an MCS, and the feedback information not including information associated with the first subset of network coding encoded packets.

In some aspects, an apparatus for wireless communication includes means for generating a plurality of source packets. The apparatus includes means for performing an encoding operation on the plurality of source packets that generates a first set of network coding encoded packets. The apparatus includes means for broadcasting the first set of network coding encoded packets for reception by a plurality of receivers. The apparatus includes means for receiving, from the plurality of receivers, feedback information associated with the first set of network coding encoded packets, the feedback information indicating that one or more receivers of the plurality of receivers did not successfully receive a quantity of network coding encoded packets that satisfies a decoding threshold associated with recovering the plurality of source packets, the feedback information further indicating a first subset of network coding encoded packets of the first set of network coding encoded packets that were not successfully received by at least one receiver of the plurality of receivers. The apparatus includes means for broadcasting a second set of network coding encoded packets for reception by at least the one or more receivers based on the feedback information indicating that the one or more receivers did not receive the quantity of network coding encoded packets that satisfies the decoding threshold, the second set of network coding encoded packets including at least the first subset of network coding encoded packets that were not successfully received by at least one receiver of the plurality of receivers.

In some aspects, an apparatus for wireless communication includes means for receiving a first subset of network coding encoded packets of a first set of network coding encoded packets broadcast for reception by a plurality of receivers including the receiver, the first set of network coding encoded packets being based on a first encoding operation performed on a plurality of source packets. The apparatus includes means for transmitting feedback information associated with a second subset of network coding encoded packets of the first set of network coding encoded packets not received by the apparatus not received by the receiver, the feedback information including CSI report information to be used in association with selecting an MCS, and the feedback information not including information associated with the first subset of network coding encoded packets.

Aspects generally include a method, apparatus, system, computer program product, non-transitory computer-readable medium, user equipment, base station, wireless communication device, or processing system as substantially described with reference to and as illustrated by the drawings and specification.

The foregoing has outlined rather broadly the features and technical advantages of examples in accordance with the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only some typical aspects of this disclosure and are therefore not to be considered limiting of its scope, for the description may admit to other equally effective aspects. The same reference numbers in different drawings may identify the same or similar elements.

FIGS. 6 and 7 are block diagrams of example apparatuses for wireless communication in accordance with the present disclosure.

DETAILED DESCRIPTION

Figure 1:
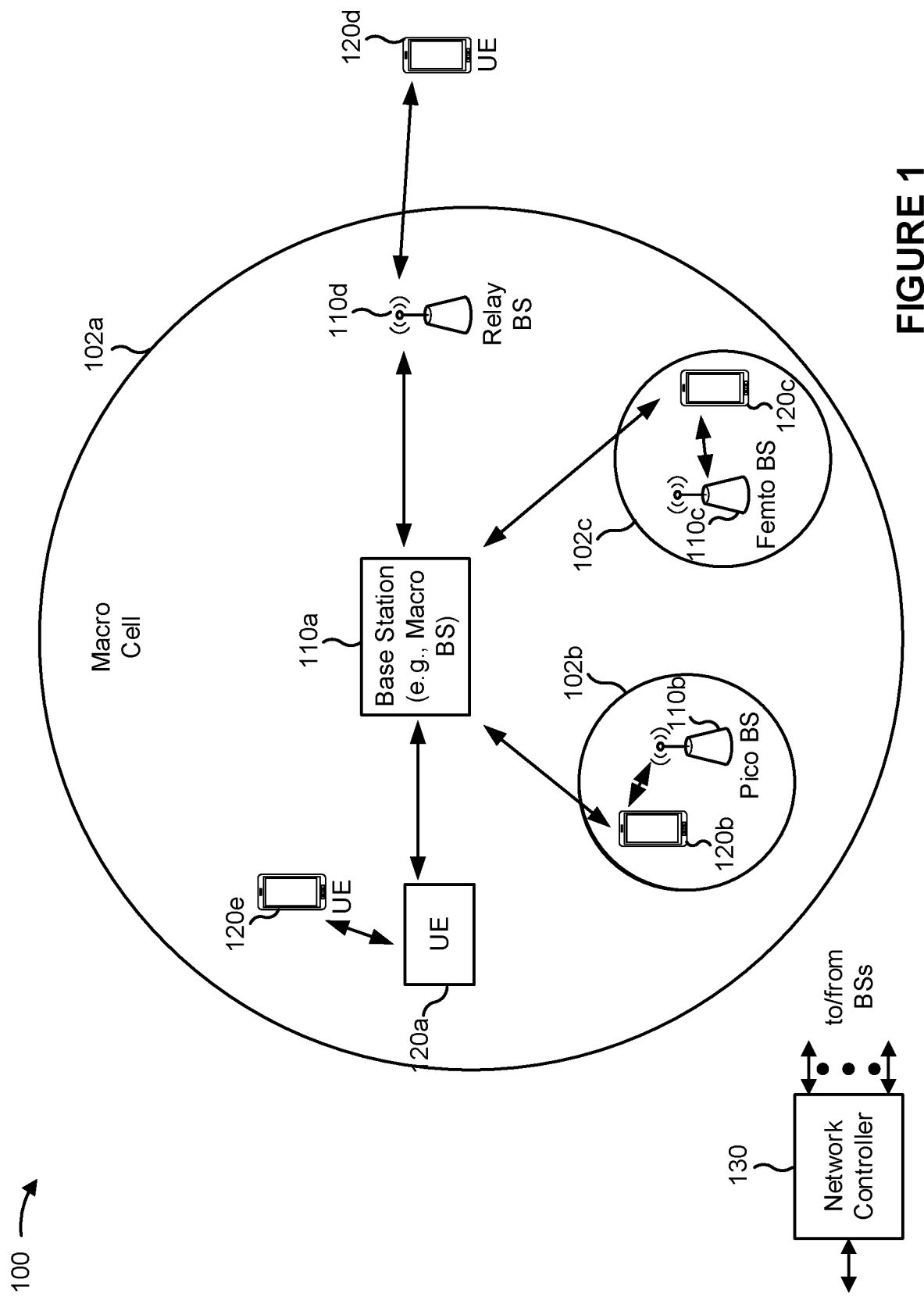
FIG. 1 is a diagram illustrating an example of a wireless network in accordance with the present disclosure.

Various aspects of the disclosure are described more fully hereinafter with reference to the accompanying drawings. This disclosure may, however, be embodied in many different forms and are not to be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art may appreciate that the scope of the disclosure is intended to cover any aspect of the disclosure disclosed herein, whether implemented independently of or combined with any other aspect of the disclosure. For example, an apparatus may be implemented or a method may be practiced using any quantity of the aspects set forth herein. In addition, the scope of the disclosure is intended to cover such an apparatus or method which is practiced using other structure, functionality, or structure and functionality in addition to or other than the various aspects of the disclosure set forth herein. Any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, or algorithms (collectively referred to as "elements"). These elements may be implemented using hardware, software, or a combination of hardware and software. Whether such elements are implemented as hardware or software depends upon the particular application and design constraints imposed on the overall system.

Various aspects relate generally to network coding encoded packet transmission. Some aspects more specifically relate to feedback-based retransmission of broadcasted network coding encoded packets. In some aspects, the techniques described herein enable a transmitter to retransmit network coding encoded packets in accordance with feedback information provided by one or more receivers in a broadcast scenario. In some aspects, the transmitter may broadcast a first set of network coding encoded packets for reception by a group of receivers, the first set of network coding encoded packets being generated based on a group of source packets to be received by each of the group of receivers. In some aspects, the transmitter may receive, from the group of receivers, feedback information associated with the first set of network coding encoded packets. In some aspects, the transmitter may determine, based at least in part on the feedback information, that one or more receivers of the plurality of receivers have not received a quantity of network coding encoded packets that satisfies a decoding threshold associated with recovering the plurality of source packets. In some aspects, the transmitter may identify, based at least in part on the feedback information, a first subset of network coding encoded packets of the first set of network coding encoded packets that were not successfully received by at least one receiver of the plurality of receivers. In some aspects, the first subset of network coding encoded packets includes only network coding encoded packets that were not successfully received by at least one receiver of the plurality of receivers. In some aspects, the transmitter may broadcast a second set of network coding encoded packets for reception by at least the one or more receivers based on the feedback information indicating that the one or more receivers did not receive the quantity of network coding encoded packets that satisfies the decoding threshold. In some aspects, the second set of network coding encoded packets includes at least the first subset of missed network coding encoded packets.

Particular aspects of the subject matter described in this disclosure can be implemented to realize one or more of the following potential advantages. In some examples, the described techniques can be used to provide feedback-based retransmission of broadcasted network coding encoded packet transmissions. Such aspects for feedback-based retransmission of broadcasted network coding encoded packet transmission may reduce network resources needed for network coding encoded packet transmission in a broadcast scenario, reduce consumption of resources (for example, power resources or processing resources) at the transmitter or the multiple receivers needed for network coding encoded packet transmission in a broadcast scenario, improve overall network efficiency, or prevent duplication of source packets at a given receiver for a network coding encoded packet transmission in a broadcast scenario, among other examples.

FIG. 1 is a diagram illustrating an example 100 of a wireless network in accordance with the present disclosure. The wireless network may be or may include elements of a 5G (NR) network or an LTE network, among other examples. The wireless network may include one or more base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, or a transmit receive point (TRP), among other examples. Each BS may provide communication coverage for a particular geographic area. In 3GPP, the term "cell" can refer to a coverage area of a BS or a BS subsystem serving this coverage area, depending on the context in which the term is used.

A BS may provide communication coverage for a macro cell, a pico cell, a femto cell, or another type of cell. A macro cell may cover a relatively large geographic area (for example, several kilometers in radius) and may allow unrestricted access by UEs with service subscription. A pico cell may cover a relatively small geographic area and may allow unrestricted access by UEs with service subscription. A femto cell may cover a relatively small geographic area (for example, a home) and may allow restricted access by UEs having association with the femto cell (for example, UEs in a closed subscriber group (CSG)). A BS for a macro cell may be referred to as a macro BS. A BS for a pico cell may be referred to as a pico BS. A BS for a femto cell may be referred to as a femto BS or a home BS. A BS may support one or multiple (for example, three) cells.

The wireless network may be a heterogeneous network that includes BSs of different types, such as macro BSs, pico BSs, femto BSs, or relay BSs. These different types of BSs may have different transmit power levels, different coverage areas, and different impacts on interference in the wireless network. For example, macro BSs may have a high transmit power level (for example, 5 to 40 watts) whereas pico BSs, femto BSs, and relay BSs may have lower transmit power levels (for example, 0.1 to 2 watts). In the example shown in FIG. 1, a BS 110a may be a macro BS for a macro cell 102a, a BS 110b may be a pico BS for a pico cell 102b, and a BS 110c may be a femto BS for a femto cell 102c. A network controller 130 may couple to the set of BSs 102a, 102b, 110a and 110b, and may provide coordination and control for these BSs. Network controller 130 may communicate with the BSs via a backhaul. The BSs may also communicate with one another, for example, directly or indirectly via a wireless or wireline backhaul.

In some aspects, a cell may not be stationary, rather, the geographic area of the cell may move in accordance with the location of a mobile BS. In some aspects, the BSs may be interconnected to one another or to one or more other BSs or network nodes (not shown) in the wireless network through various types of backhaul interfaces, such as a direct physical connection or a virtual network, using any suitable transport network.

The wireless network may also include relay stations. A relay station is an entity that can receive a transmission of data from an upstream station (for example, a BS or a UE) and send a transmission of the data to a downstream station (for example, a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, or a relay, among other examples.

UEs 120 (for example, 120a, 120b, 120c) may be dispersed throughout the wireless network, and each UE may be stationary or mobile. A UE may also be referred to as an access terminal, a terminal, a mobile station, a subscriber unit, or a station, among other examples. A UE may be a cellular phone (for example, a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (for example, smart ring, smart bracelet)), an entertainment device (for example, a music or video device, or a satellite radio), a vehicular component or sensor, smart meters/sensors, industrial manufacturing equipment, a global positioning system device, or any other suitable device that is configured to communicate via a wireless medium.

Some UEs may be considered machine-type communication (MTC) or evolved or enhanced machine-type communication (eMTC) UEs. MTC and eMTC UEs include, for example, robots, drones, remote devices, sensors, meters, monitors or location tags, among other examples, that may communicate with a base station, another device (for example, remote device), or some other entity. A wireless node may provide, for example, connectivity for or to a network (for example, a wide area network such as Internet or a cellular network) via a wired or wireless communication link. Some UEs may be considered Internet-of-Things (IoT) devices, or may be implemented as NB-IoT (narrowband internet of things) devices. Some UEs may be considered a Customer Premises Equipment (CPE). UE 120 may be included inside a housing that houses components of UE 120, such as processor components or memory components, among other examples.

In general, any quantity of wireless networks may be deployed in a given geographic area. Each wireless network may support a particular radio access technology (RAT) and may operate on one or more frequencies or frequency channels. A frequency may also be referred to as a carrier among other examples. Each frequency may support a single RAT in a given geographic area in order to avoid interference between wireless networks of different RATs. In some cases, NR or 5G RAT networks may be deployed.

In some aspects, two or more UEs 120 (for example, shown as UE 120*a* and UE 120*e*) may communicate directly with one another using one or more sidelink channels (for example, without using a base station 110 as an intermediary). For example, the UEs 120 may communicate using peer-to-peer (P2P) communications, device-to-device (D2D) communications, a vehicle-to-everything (V2X) protocol (for example, which may include a vehicle-to-vehicle (V2V) protocol or a vehicle-to-infrastructure (V2I) protocol), a mesh network, or a combination thereof. In such examples, the UE 120 may perform scheduling operations, resource selection operations, or other operations described elsewhere herein as being performed by the base station 110.

Devices of the wireless network may communicate using the electromagnetic spectrum, which may be subdivided based on frequency or wavelength into various classes, bands, or channels. For example, devices of the wireless network may communicate using an operating band having a first frequency range (FR1), which may span from 410 MHz to 7.125 GHz. As another example, devices of the wireless network may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" may broadly represent frequencies less than 6 GHz, frequencies within FR1, mid-band frequencies (for example, greater than 7.125 GHz), or a combination thereof. Similarly, unless specifically stated otherwise, it should be understood that the term "millimeter wave" may broadly represent frequencies within the EHF band, frequencies within FR2, mid-band frequencies (for example, less than 24.25 GHz), or a combination thereof. The frequencies included in FR1 and FR2 may be modified, and techniques described herein are applicable to those modified frequency ranges.

Figure 2:
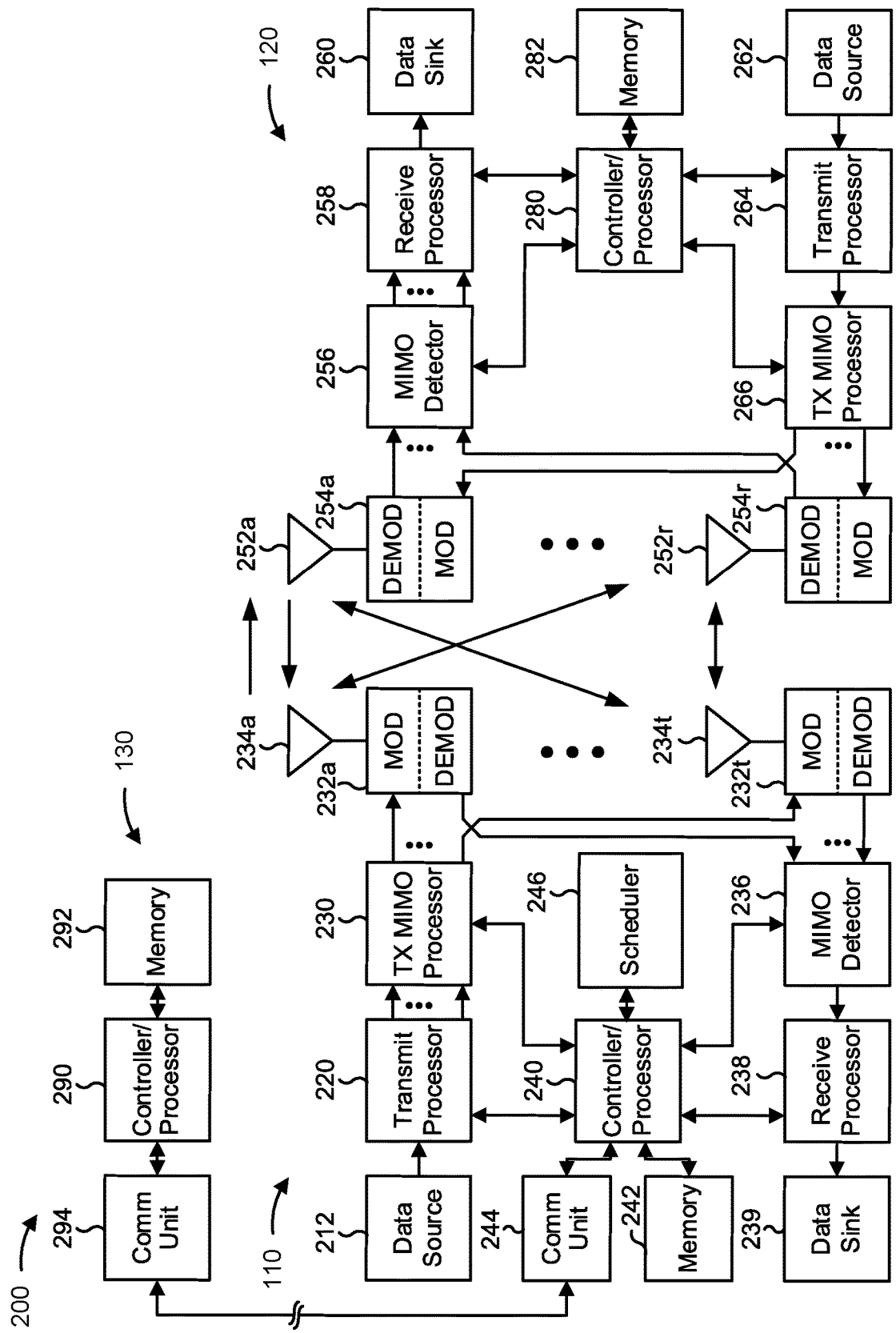
FIG. 2 is a diagram illustrating an example base station (BS) in communication with a user equipment (UE) in a wireless network in accordance with the present disclosure.

FIG. 2 is a diagram illustrating an example base station in communication with a UE in a wireless network in accordance with the present disclosure. The base station may correspond to base station 110 of FIG. 1. Similarly, the UE may correspond to UE 120 of FIG. 1.

Base station 110 may be equipped with T antennas 234*a* through 234*t*, and UE 120 may be equipped with R antennas 252*a* through 252*r*, where in general T>1 and R>1. At base station 110, a transmit processor 220 may receive data from a data source 212 for one or more UEs, select one or more modulation and coding schemes (MCSs) for each UE based at least in part on channel quality indicators (CQIs) received from the UE, process (for example, encode) the data for each UE based at least in part on the MCS(s) selected for the UE, and provide data symbols for all UEs. Transmit processor 220 may also process system information (for example, for semi-static resource partitioning information (SRPI) among other examples) and control information (for example, CQI requests, grants, or upper layer signaling) and provide overhead symbols and control symbols. Transmit processor 220 may also generate reference symbols for reference signals and synchronization signals. A transmit (TX) multiple-input multiple-output (MIMO) processor 230 may perform spatial processing (for example, precoding) on the data symbols, the control symbols, the overhead symbols, or the reference symbols, if applicable, and may provide T output symbol streams to T modulators (MODs) 232*a* through 232*t*. Each MOD 232 may process a respective output symbol stream (for example, for OFDM among other examples) to obtain an output sample stream. Each MOD 232 may further process (for example, convert to analog, amplify, filter, and upconvert) the output sample stream to obtain a downlink signal. T downlink signals from MODs 232*a* through 232*t* may be transmitted via T antennas 234*a* through 234*t*, respectively.

At UE 120, antennas 252*a* through 252*r* may receive the downlink signals from base station 110 or other base stations and may provide received signals to R demodulators (DEMODs) 254*a* through 254*r*, respectively. Each DEMOD 254 may condition (for example, filter, amplify, downconvert, and digitize) a received signal to obtain input samples. Each DEMOD 254 may further process the input samples (for example, for OFDM) to obtain received symbols. A MIMO detector 256 may obtain received symbols from all R DEMODs 254*a* through 254*r*, perform MIMO detection on the received symbols if applicable, and provide detected symbols. A receive processor 258 may process (for example, decode) the detected symbols, provide decoded data for UE 120 to a data sink 260, and provide decoded control information and system information to a controller/processor 280. The term "controller/processor" may refer to one or more controllers, one or more processors, or a combination of one or more controllers and one or more processors. A channel processor may determine one or more of a reference signal received power (RSRP) parameter, a received signal strength indicator (RSSI) parameter, a reference signal received quality (RSRQ) parameter, or a channel quality indicator (CQI) parameter, among other examples. In some aspects, one or more components of UE 120 may be included in a housing.

Network controller 130 may include communication unit 294, controller/processor 290, and memory 292. Network controller 130 may include, for example, one or more devices in a core network. Network controller 130 may communicate with base station 110 via communication unit 294.

Antennas (such as antennas 234*a* through 234*t* or antennas 252*a* through 252*r*) may include, or may be included within, one or more antenna panels, antenna groups, sets of antenna elements, or antenna arrays, among other examples.

An antenna panel, an antenna group, a set of antenna elements, or an antenna array may include one or more antenna elements. An antenna panel, an antenna group, a set of antenna elements, or an antenna array may include a set of coplanar antenna elements or a set of non-coplanar antenna elements. An antenna panel, an antenna group, a set of antenna elements, or an antenna array may include antenna elements within a single housing or antenna elements within multiple housings. An antenna panel, an antenna group, a set of antenna elements, or an antenna array may include one or more antenna elements coupled to one or more transmission or reception components, such as one or more components of FIG. 2.

On the uplink, at UE 120, a transmit processor 264 may receive and process data from a data source 262 as well as control information (for example, for reports including RSRP, RSSI, RSRQ, or CQI) from controller/processor 280. Transmit processor 264 may also generate reference symbols for one or more reference signals. The symbols from transmit processor 264 may be precoded by a TX MIMO processor 266 if applicable, further processed by MODs 254a through 254r (for example, for discrete Fourier transform spread orthogonal frequency division multiplexing (DFT-s-OFDM) or orthogonal frequency division multiplexing (OFDM) with a cyclic prefix (CP) (CP-OFDM)), and transmitted to base station 110. In some aspects, a modulator and a demodulator (for example, MOD/DEMOD 254) of the UE 120 may be included in a modem of the UE 120. In some aspects, the UE 120 includes a transceiver. The transceiver may include any combination of antenna(s) 252, modulators 254, demodulators 254, MIMO detector 256, receive processor 258, transmit processor 264, or TX MIMO processor 266. The transceiver may be used by a processor (for example, controller/processor 280) and memory 282 to perform aspects of any of the methods described herein.

At base station 110, the uplink signals from UE 120 and other UEs may be received by antennas 234, processed by DEMODs 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and uplink communications. In some aspects, a modulator and a demodulator (for example, MOD/DEMOD 232) of the base station 110 may be included in a modem of the base station 110. In some aspects, the base station 110 includes a transceiver. The transceiver may include any combination of antenna(s) 234, modulators 232, demodulators 232, MIMO detector 236, receive processor 238, transmit processor 220, or TX MIMO processor 230. The transceiver may be used by a processor (for example, controller/processor 240) and memory 242 to perform aspects of any of the methods described herein.

Controller/processor 240 of base station 110, controller/processor 280 of UE 120, or any other component(s) of FIG. 2 may perform one or more techniques associated with feedback-based broadcast of network coding encoded packets, as described in more detail elsewhere herein. For example, controller/processor 240 of base station 110, controller/processor 280 of UE 120, or any other component(s) of FIG. 2 may perform or direct operations of, for example, process 400 of FIG. 4, process 500 of FIG. 5, or other processes as described herein. Memories 242 and 282 may store data and program codes for base station 110 and UE 120, respectively. In some aspects, memory 242 or memory 282 may include a non-transitory computer-readable medium storing one or more instructions (for example, code or program code) for wireless communication. For example, the one or more instructions, when executed (for example, directly, or after compiling, converting, or interpreting) by one or more processors of the base station 110 or the UE 120, may cause the one or more processors, the UE 120, or the base station 110 to perform or direct operations of, for example, process 400 of FIG. 4, process 500 of FIG. 5, or other processes as described herein. In some aspects, executing instructions may include running the instructions, converting the instructions, compiling the instructions, or interpreting the instructions, among other examples.

In some aspects, a transmitter (such as a UE 120 or a base station 110) may include means for generating a plurality of source packets; means for performing an encoding operation on the plurality of source packets that generates a first set of network coding encoded packets; means for broadcasting the first set of network coding encoded packets for reception by a plurality of receivers; means for receiving, from the plurality of receivers, feedback information associated with the first set of network coding encoded packets, the feedback information indicating that one or more receivers of the plurality of receivers did not successfully receive a quantity of network coding encoded packets that satisfies a decoding threshold associated with recovering the plurality of source packets, the feedback information further indicating a first subset of network coding encoded packets of the first set of network coding encoded packets that were not successfully received by at least one receiver of the plurality of receivers; or means for broadcasting a second set of network coding encoded packets for reception by at least the one or more receivers based on the feedback information indicating that the one or more receivers did not receive the quantity of network coding encoded packets that satisfies the decoding threshold, the second set of network coding encoded packets including at least the first subset of network coding encoded packets that were not successfully received by at least one receiver of the plurality of receivers; among other examples, or combinations thereof. In some aspects, when the transmitter is a UE 120, such means may include one or more components of UE 120 described in connection with FIG. 2, such as controller/processor 280, transmit processor 264, TX MIMO processor 266, MOD 254, antenna 252, DEMOD 254, MIMO detector 256, or receive processor 258. In some aspects, when the transmitter is a base station 110, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, or antenna 234, among other examples.

In some aspects, a receiver (such as a UE 120 or a base station 110) may include means for receiving a first subset of network coding encoded packets of a first set of network coding encoded packets broadcast for reception by a plurality of receivers including the receiver, the first set of network coding encoded packets being based on a first encoding operation performed on a plurality of source packets; or means for transmitting feedback information associated with a second subset of network coding encoded packets of the first set of network coding encoded packets not received by the receiver, the feedback information including channel state information (CSI) report information to be used in association with selecting a modulation and coding scheme (MCS), and the feedback information not including information associated with the first subset of network coding encoded packets; among other examples, or combinations thereof. In some aspects, when the receiver is a UE 120, such means may include one or more components of UE 120 described in connection with FIG. 2, such as controller/processor 280, transmit processor 264, TX MIMO processor 266, MOD 254, antenna 252, DEMOD 254, MIMO detector 256, or receive processor 258. In some aspects, when the receiver is a base station 110, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, or antenna 234, among other examples.

A transmitter (such as a base station 110 or a UE 120) may need to transmit the same group of source packets to multiple receivers (including one or more UEs 120 or one or more base stations 110). In some deployments, the transmitter may be configured to transmit the group of packets to the multiple receivers via broadcast transmission(s) that use a network coding technique.

In accordance with a conventional network coding technique, the transmitter may generate a first set of network coding encoded packets from the group of source packets and broadcast the first set of network coding encoded packets for reception by the multiple receivers. The transmitter may generate a second set of network coding encoded packets from the same group of source packets and broadcast the second set of network coding encoded packets for reception by the multiple receivers. In accordance with the conventional network coding technique used in the broadcast scenario, feedback information associated with the first set of network coding encoded packets is not provided by any of the multiple receivers and, therefore, the transmitter does not rely on feedback information when generating or broadcasting the second set of network coding encoded packets (for example, because the transmitter is unaware of a source packet recovery/decoding status at a given receiver). The transmitter may repeat this process (for example, for a particular amount of time or for a particular quantity of iterations) to improve the likelihood that all of the receivers successfully recover all of the source packets. The lack of feedback information utilization can result in wasted network resources, wasted resources (for example, power resources or processing resources) at the transmitter or the multiple receivers, a reduction in overall network efficiency, and a duplication of source packets at a given receiver, among other examples.

Various aspects relate generally to network coding encoded packet transmission. Some aspects more specifically relate to feedback-based retransmission of broadcasted network coding encoded packets. In some aspects, the techniques described herein enable a transmitter to update network coding encoded packets in accordance with feedback information provided by one or more receivers in a broadcast scenario. In some aspects, the transmitter may broadcast a first set of network coding encoded packets for reception by a group of receivers, where the first set of network coding encoded packets is generated based on a group of source packets to be received by each of the group of receivers. In some aspects, the transmitter may receive, from the group of receivers, feedback information associated with the first set of network coding encoded packets. In some aspects, the transmitter may determine, based at least in part on the feedback information, that one or more receivers of the group of receivers have not received a quantity of network coding encoded packets that satisfies a decoding threshold associated with recovering the group of source packets. In some aspects, the transmitter may identify, based at least in part on the feedback information, a first subset of network coding encoded packets, of the first set of network coding encoded packets, that were not successfully received by at least one receiver of the plurality of receivers. In some aspects, the first subset of network coding encoded packets may include only network coding encoded packets that were not successfully received by at least one receiver of the group of receivers. In some aspects, the transmitter may broadcast a second set of network coding encoded packets for reception by at least the one or more receivers based on the feedback information indicating that the one or more receivers did not receive the quantity of network coding encoded packets that satisfies the decoding threshold. In some aspects, the second set of network coding encoded packets may include at least the first subset of network coding encoded packets.

Particular aspects of the subject matter described in this disclosure can be implemented to realize one or more of the following potential advantages. In some examples, the described techniques can be used to provide feedback-based retransmission of broadcasted network coding encoded packets. Such aspects for feedback-based retransmission of broadcasted network coding encoded packets described herein may reduce network resources needed for network coding encoded packet transmission in a broadcast scenario. Further, some aspects for feedback-based retransmission of broadcasted network coding encoded packets described herein may reduce consumption of resources (for example, power resources or processing resources) at the transmitter or the multiple receivers needed for network coding encoded packet transmission in a broadcast scenario. Additionally, some other aspects for feedback-based retransmission of broadcasted network coding encoded packets described herein improve overall network efficiency and may prevent duplication of source packets at a given receiver for a network coding encoded packet transmission in a broadcast scenario.

Figure 3A:
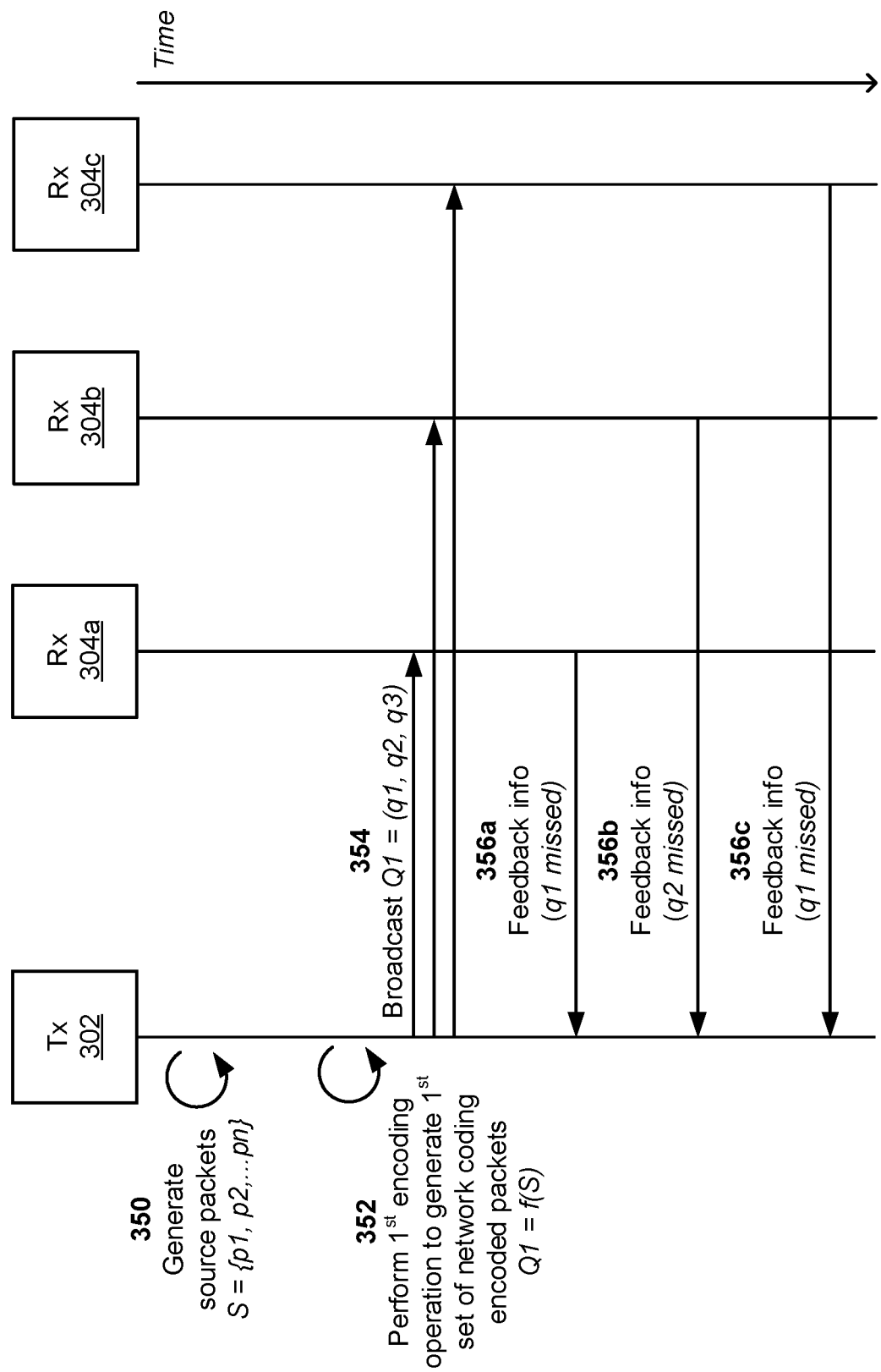
FIGS. 3A and 3B are diagrams illustrating an example associated with feedback-based retransmission of broadcast network coding encoded packets in accordance with the present disclosure.
Figure 3B:
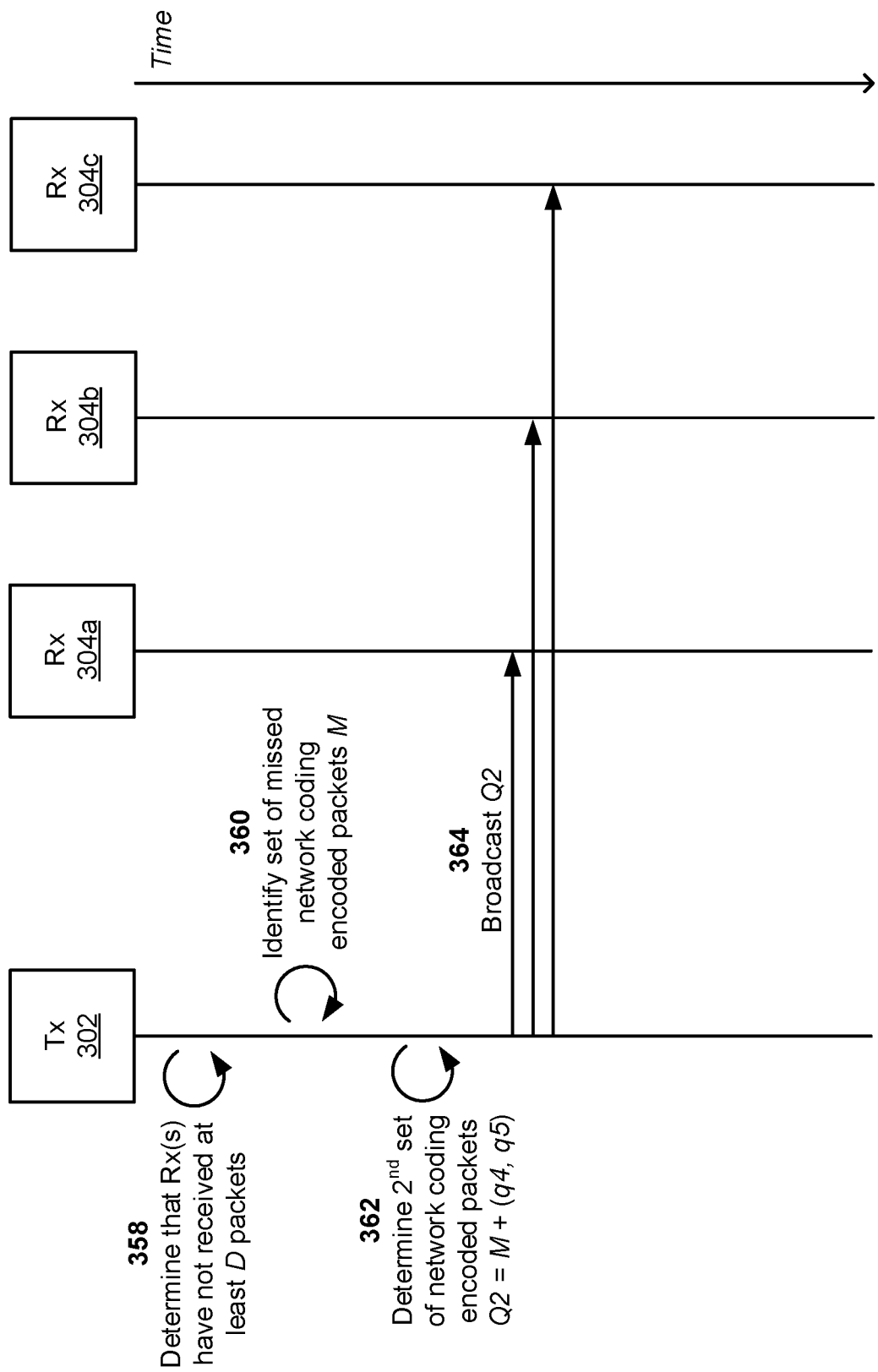

FIGS. 3A and 3B are timing diagrams illustrating an example associated with feedback-based retransmission of broadcasted network coding encoded packets in accordance with the present disclosure. As shown in FIGS. 3A and 3B, the example associated with feedback-based retransmission of broadcasted network coding encoded packets includes a transmitter (Tx) 302 and a group of receivers (Rx) 304a-304c. Notably, while three receivers 304 are shown, the group of receivers may include any quantity of receivers. In some aspects, the transmitter 302 may be included in a base station (for example, a base station 110) or a UE (for example, a UE 120). In some aspects, a given receiver 304 may be included in a UE (such as a UE 120) or a base station (such as a base station 110).

As shown in FIG. 3A, in a first operation 350, the transmitter 302 may generate a group of source packets S. The group of source packets includes multiple packets p1-pn (where n>1) that are to be broadcast by the transmitter 302 for reception by each receiver 304 in the group of receivers 304.

In a second operation 352, the transmitter 302 may perform a first encoding operation on the group of source packets to generate a group of network coding encoded packets Q1, including network coding encoded packets q1-qm (where m>1). That is, the transmitter 302 may apply a network coding encoding function (identified as the function f) to the group of source packets, a result of which is a group of network coding encoded packets. In some aspects, the first encoding operation may utilize a Luby transform (LT) code and generating an encoded symbol may include, for example, (1) determining a degree d of the encoded symbol by randomly choosing the degree d from a given node degree distribution p(x), (2) randomly choosing d distinct information symbols from a pool of symbols to be encoded (these d information symbols will be elements of the encoded symbol), and (3) assigning the exclusive-or (XOR) of the chosen d information symbols to the encoding symbol.

In a third operation 354, the transmitter 302 may broadcast a first set of network coding encoded packets for reception by the group of receivers 304. In some aspects, the first set of network coding encoded packets may be included in the group of network coding encoded packets. For example, the first set of network coding encoded packets may be a subset of the group of network coding encoded packets. In some aspects, the transmitter 302 may broadcast the first set of network coding encoded packets on a broadcast channel (BCH). In some aspects, the transmitter 302 may transmit the first set of network coding encoded packets using a conventional BCH format (such as, a legacy BCH format).

In a fourth operation 356a, a fifth operation 356b, and a sixth operation 356c, the transmitter 302 may receive feedback information, associated with the first set of network coding encoded packets, from the receiver 304a, the receiver 304b, and the receiver 304c, respectively. In some aspects, the feedback information may be communicated in a synchronized manner. For example, each receiver 304 may be configured to transmit feedback information simultaneously at predefined time instances (t0, t0+tk, t0+2tk, and so on). In some aspects, the feedback information may be received via uplink control information (UCI) in a physical uplink control channel (PUCCH) or via UCI multiplexed with a physical uplink shared channel (PUSCH). In some aspects, a given receiver 304 may transmit the feedback information via, for example, a packet data convergence protocol (PDCP) status report, a radio link control (RLC) status report, or a medium access control (MAC) hybrid automatic repeat request (HARD) acknowledgment, among other examples.

In some aspects, the feedback information from a given receiver 304 may identify or otherwise indicate each of (or a subset of) the network coding encoded packets, of the first set of network coding encoded packets, missed by the receiver 304. That is, the feedback information may identify or otherwise indicate each of the network coding encoded packets from the first set of network coding encoded packets that were not successfully received by the receiver 304. For example, as indicated with reference to operation 356a, the feedback information received from the receiver 304a may indicate that the receiver 304a missed (in other words, did not successfully receive) network coding encoded packet q1. As another example, as indicated with reference to operation 356b, the feedback information received from the receiver 304b may indicate that the receiver 304b missed network coding encoded packet q2. As another example, as indicated with reference to operation 356c, the feedback information received from the receiver 304c may indicate that the receiver 304b also missed network coding encoded packet q1.

In some aspects, each of some or all of the receivers 304 may generate or obtain CSI report information based on the reception of the network coding encoded packets and include, in or with their respective feedback information, respective CSI report information. For example, a given receiver 304 may receive one or more (a first subset of) network coding encoded packets in the first set of network coding encoded packets and may fail to receive one or more (a second subset of) network coding encoded packets in the first set of network coding encoded packets. The given receiver 304 may transmit feedback information based on the reception (or lack of reception) of the network coding encoded packets as well as transmit, in or with the feedback information, CSI report information. In some aspects, the given receiver 304 may transmit feedback information for only the one or more (a second subset of) network coding encoded packets that were not successfully received by the given receiver 304. In other words, in some aspects, the feedback information may only include negative acknowledgment (NACK) feedback. In some aspects, a given receiver 304 may obtain the CSI report information (such as a signal-to-interference-plus-noise ratio (SINR), a reference signal received power (RSRP), among other examples) based at least in part on measuring a reference signal, such as a demodulation reference signal (DMRS). In some aspects, the CSI report information may be used by the transmitter 302 in association with selecting an MCS, as described below. In some examples, a given receiver 304 may include the CSI report information in the feedback information only when the feedback information includes a NACK associated with at least one network coding encoded packet of the first set of network coding encoded packets.

As shown in FIG. 3B, in a seventh operation 358, the transmitter 302 may determine, based at least in part on the feedback information, that one or more of the group of receivers 304 have not received a quantity of network coding encoded packets that satisfies a decoding threshold D associated with recovering the group of source packets. In some aspects, the decoding threshold indicates a minimum quantity of network coding encoded packets needed for a given receiver 304 to successfully recover the group of source packets (by decoding received network coding encoded packets).

As an example, in some aspects, the feedback information from each of the receivers 304 may identify or otherwise indicate one or more network coding encoded packets from the first set of network coding encoded packets that were missed by the respective receiver 304, as described above. In such examples, for a given receiver 304, the transmitter 302 may identify a total quantity of unique network coding encoded packets received by the given receiver 304 based at least in part on the feedback information. That is, the transmitter 302 may identify a total quantity of unique (that is, non-repetitive) network coding encoded packets indicated as having been received by the given receiver 304. In some examples, the transmitter 302 may determine whether the total quantity of unique network coding encoded packets received by the given receiver 304 is less than a decoding threshold configured on the transmitter 302. That is, the transmitter 302 may determine whether the given receiver 304 has received a quantity of network coding encoded packets sufficient such that the given receiver 304 should be able to recover all of the group of source packets. Here, if the total quantity of unique network coding encoded packets is less than a quantity of network coding encoded packets indicated by the decoding threshold, then the transmitter 302 may determine that the given receiver 304 has not received a total quantity of unique network coding encoded packets that satisfies the decoding threshold. Conversely, if the total quantity of unique network coding encoded packets is greater than or equal to the quantity of network coding encoded packets indicated by the decoding threshold, then the transmitter 302 may determine that the given receiver 304 has received a total quantity of unique network coding encoded packets that satisfies the decoding threshold. The transmitter 302 may perform this process for each receiver 304 to determine whether one or more receivers 304 have received a total quantity of unique network coding encoded packets that satisfies the decoding threshold.

In some examples, the transmitter 302 may store, for each of the receivers 304, an indication of the total quantity of unique network coding encoded packets received by the respective receiver 304. The transmitter 302 may update the stored information after each broadcast transmission or at another suitable interval such that the transmitter 302 maintains, for each of the receivers 304, a running total of the quantity of network coding encoded packets received by the respective receiver 304. In some examples, the transmitter 302 can use the stored indication of the total quantity of unique network coding encoded packets and additional feedback information (for example feedback information associated with a later broadcast transmission) to determine whether the given receiver 304 has received a quantity of unique network coding encoded packets that satisfies the decoding threshold.

As noted above, the transmitter 302 has (for example, in a manner described above) determined that one or more receivers 304 have not received a quantity of network coding encoded packets that satisfies the decoding threshold (in other words, that at least one receiver 304 has not received a quantity of network coding encoded packets that satisfies the decoding threshold). Responsive to the determination, in an eighth operation 360, the transmitter 302 may identify a set of missed network coding encoded packets M associated with the group of receivers. In some aspects, the transmitter 302 may identify the set of missed network coding encoded packets based at least in part on the feedback information.

In some examples, the transmitter 302 may identify the set of missed network coding encoded packets of the first set of network coding encoded packets based at least in part on the feedback information by identifying network coding encoded packets of the first set of network coding encoded packets that were missed by all of the receivers 304. Put another way, in some aspects, the set of missed network coding encoded packets may include one or more network coding encoded packets, of the first set of network coding encoded packets, missed by all receivers 304. That is, the set of missed network coding encoded packets may include an intersection of network coding encoded packets indicated as being missed by the receivers 304. As an example, the feedback information may indicate that the receiver 304a missed network coding encoded packet q1; that receiver 304b missed network coding encoded packet q2; and that the receiver 304c missed network coding encoded packet q1. In such examples, the transmitter 302 identifies the set of non-received network coding encoded packets as including no network coding encoded packets (because none of network coding encoded packets q1, q2, or q3 were indicated as being missed by all receivers 304).

In some other examples, the transmitter 302 may identify the set of missed network coding encoded packets based at least in part on the feedback information by identifying network coding encoded packets of the first set of network coding encoded packets that were missed by at least one receiver 304, where the identified set of missed network coding encoded packets includes only network coding encoded packets that were missed by at least one receiver 304. Put another way, in some aspects, the set of missed network coding encoded packets may include one or more network coding encoded packets, of the first set of network coding encoded packets, missed by at least one of the receivers 304. That is, the set of missed network coding encoded packets may include a union of network coding encoded packets indicated as being missed by the receivers 304. As an example, the feedback information may indicate that the receiver 304a missed network coding encoded packet q1; that receiver 304b missed network coding encoded packet q2; and that the receiver 304c missed network coding encoded packet q1. In such examples, the transmitter 302 identifies the set of missed network coding encoded packets as including network coding encoded packets q1 and q2 (because network coding encoded packets q1 and q2 were each indicated as being missed by at least one receiver 304).

In some other examples, the transmitter 302 may identify the set of missed network coding encoded packets based at least in part on the feedback information by identifying a particular quantity k (where k>1) of most frequently missed network coding encoded packets of the first set of network coding encoded packets that were missed by at least one receiver 304. Put another way, in some aspects, the set of missed network coding encoded packets may include a particular quantity of the most frequently missed network coding encoded packets, of the first set of network coding encoded packets, where each of the most frequently missed packets is missed by at least one of the receivers 304. That is, the set of missed network coding encoded packets may include at least one network coding encoded packet from a union of network coding encoded packets indicated as being missed by the receivers 304. In some aspects, k may be utilized so as to include one or more most frequently missed network coding encoded packets. As an example, the feedback information may indicate that the receiver 304a missed network coding encoded packet q1; that receiver 304b missed network coding encoded packet q2; and that the receiver 304c missed network coding encoded packet q1. In such examples, if the value of k is configured as 1, the transmitter 302 will identify the set of missed network coding encoded packets as including the single most frequently missed network coding encoded packet from the first set of network coding encoded packets. Here, the transmitter 302 identifies the set of missed network coding encoded packets as including network coding encoded packet q1 (because network coding encoded packet q1 was indicated as being missed by both receiver 304a and receiver 304c). Notably, because k=1 in this example and network coding encoded packet q2 was indicated as being missed by only receiver 304b (as compared to network coding encoded packet q1 being missed by two receivers 304), the transmitter 302 identifies the set of missed network coding encoded packets as including network coding encoded packet q1 rather than network coding encoded packet q2. In an alternative example where k=2, the transmitter identifies the set of missed network coding encoded packets as including both network coding encoded packets q1 and q2.

In some examples, the transmitter 302 may identify a set of missed network coding encoded packets for each receiver 304 based at least in part on stored information indicating network coding encoded packets previously missed by each receiver 304 of the group of receivers. That is, in some aspects, the transmitter 302 may determine the set of missed network coding encoded packets for a given receiver 304 based on some stored indication of a network coding encoded packet previously missed by the given receiver 304.

In a ninth operation 362, the transmitter 302 may determine a second set of network coding encoded packets (Q2) and, in a tenth operation 364, the transmitter 302 may broadcast the second set of network coding encoded packets for reception by at least the one or more receivers 304. In some aspects, the transmitter 302 may determine or broadcast the second set of network coding encoded packets based on the determination that one or more of the receivers 304 have not received a quantity of network coding encoded packets that satisfies the decoding threshold.

In some aspects, the second set of network coding encoded packets includes the set of missed network coding encoded packets. That is, any network coding encoded packets of the first set of network coding encoded packets that were included in the set of missed network coding encoded packets may be included in the second set of network coding encoded packets.

In some aspects, the second set of network coding encoded packets includes one or more network coding encoded packets generated by the performing of the encoding operation on the group of source packets. For example, at operation 352, the transmitter 302 may generate a group of network coding encoded packets including network coding encoded packets q1, q2, q3, q4, and q5. However, as described above, the first set of network coding encoded packets may include only network coding encoded packets q1, q2, and q3. This may be the case when, for example, not all network coding encoded packets generated at operation 352 could be included in the first set of network coding encoded packets (for example, due to a bandwidth limitation). In such examples, the second set of network coding encoded packets may include the set of missed network coding encoded packets and one or more other network coding encoded packets generated at operation 352. As an example, the second set of network coding encoded packets may include network coding encoded packet q1 (for example, when the set of missed network coding encoded packets includes only network coding encoded packet q1), as well as network coding encoded packets q4 and q5 (that is, the network coding encoded packets generated at operation 352 that have were not previously broadcast by the transmitter 302).

In some aspects, the transmitter 302 may repeat one or more of the above-described operations. For example, the transmitter 302 may repeat one or more of the above-described operations until the transmitter 302 has determined that each receiver 304 has received a quantity of network coding encoded packets that satisfies the decoding threshold, until a threshold amount of time has passed (for example, a threshold amount of time since the broadcasting of the first set of network coding encoded packets), or until a threshold quantity of broadcasts has been reached. As a particular example, after broadcasting the second set of network coding encoded packets, the transmitter 302 may receive, from each receiver 304, feedback information associated with the second set of network coding encoded packets. Here, the transmitter 302 may determine, based at least in part on the second feedback information (and in the manner described above), that each of the receivers 304 has received a quantity of network coding encoded packets that satisfies the decoding threshold. The transmitter 302 may then cease broadcasting of network coding encoded packets associated with the current group of source packets.

In some aspects, the transmitter 302 may generate other network coding encoded packets (for example, based on performing a second encoding operation on another group of source packets). That is, the transmitter 302 may apply the network coding encoding function ($f$) to another group of source packets, a result of which is another group of network coding encoded packets. In some aspects, the transmitter 302 may select an MCS associated with generating or transmitting the other group of network coding encoded packets based on feedback information from at least one of the receivers 304 including the CSI report information, as described above.

In some aspects, the transmitter 302 may configure itself and each of the receivers 304 with a same set of network coding parameters. The set of network coding parameters may include one or more parameters used to generate network coding encoded packets or to decode network coding encoded packets. For example, the set of network coding parameters may include an indication of each of one or more of the decoding threshold, a network coding algorithm, an encoding function, an encoding matrix, or a maximum quantity of decoding iterations, among other examples. By configuring itself and each of the receivers 304 with the same set of network coding parameters, the transmitter ensures that an encoding matrix, an encoding function, and a decoding function are synchronized across the transmitter 302 and the receivers 304. To configure the receivers 304, the transmitter 302 may, in some aspects, transmit an indication of the set of network coding parameters to the group of receivers 304 via, for example, a medium access control (MAC) control element, downlink control information (DCI), or a radio resource control (RRC) configuration.

In some aspects, a single set of network coding parameters may be configured on the transmitter 302 and each of the receivers 304 at a given time. In such a scenario, in some aspects, a receiver 304 may transmit a request for a new set of network coding parameters. For example, the receiver 304 may determine that its decoding operations are resulting in high rates of error or otherwise identify that the decoding or recovery process is underperforming. Responsive to identifying decoding or recovery underperformance, the receiver 304 may transmit (for example, via a MAC control element or uplink control information (UCI), among other examples) the request for the new set of network coding parameters. Here, the transmitter 302 may receive the request for the new set of network coding parameters and may transmit an indication of a new set of network coding parameters to the group of receivers 304 based at least in part on the request from the receiver 304.

In some aspects, the set of network coding parameters may be one of multiple sets of network coding parameters configured on the transmitter 302 and each receiver 304. In such a scenario, in some aspects, a receiver 304 may transmit a request to switch a currently used set of network coding parameters. For example, the receiver 304 may identify underperforming decoding or recovery at the receiver 304 and may transmit (for example, via a MAC control element or UCI, among other examples) the request to switch from the currently used set of network coding parameters to a new set of network coding parameters based at least in part on this identification. Here, the transmitter 302 may receive the request to switch network coding parameters and may transmit an indication to use another of the multiple sets of network coding parameters to the group of receivers 304 based at least in part on the request from the receiver 304.

Figure 4:
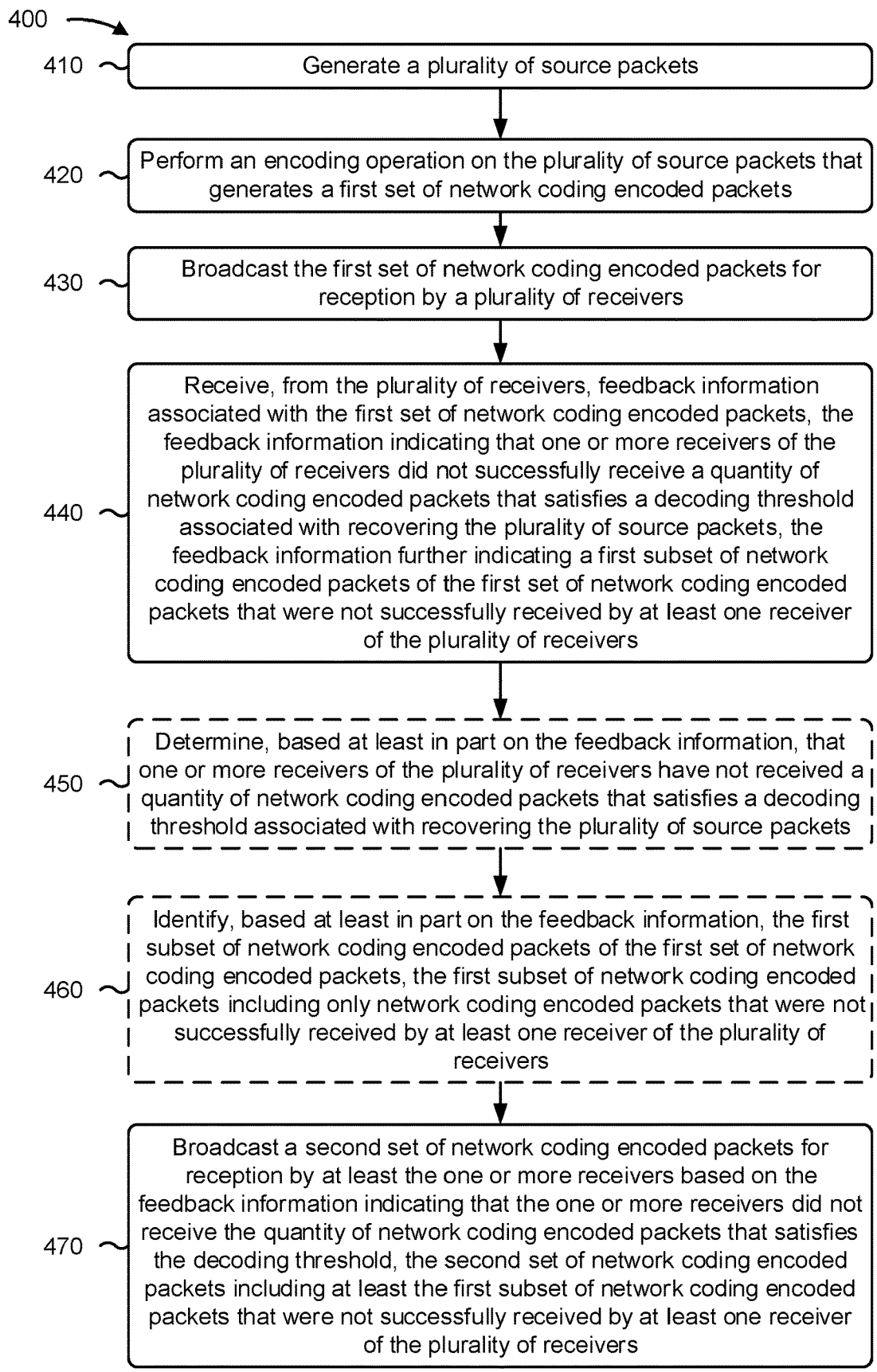
FIG. 4 is a flowchart illustrating an example process associated with performing feedback-based retransmission of broadcast network coding encoded packets, in accordance with the present disclosure.

FIG. 4 is a flowchart illustrating an example process 400 performed, for example, by a transmitter in accordance with the present disclosure. Example process 400 is an example where the transmitter (for example, a base station 110, or a UE 120, among other examples) performs operations associated with feedback-based retransmission of broadcast network coding encoded packets.

As shown in FIG. 4, in some aspects, process 400 may include generating a plurality of source packets (block 410). For example, the transmitter may generate a plurality of source packets, as described above. When the transmitter is included in a base station 110, the transmitter may generate the plurality of source packets using transmit processor 220, receive processor 238, controller/processor 240, memory 242, or another component. When the transmitter is included in a UE 120, the transmitter may generate the plurality of source packets using receive processor 258, transmit processor 264, controller/processor 280, memory 282, or another component.

As further shown in FIG. 4, in some aspects, process 400 may include performing an encoding operation on the plurality of source packets that generates a first set of network coding encoded packets (block 420). For example, the transmitter may perform an encoding operation on the plurality of source packets that generates a first set of network coding encoded packets, as described above. When the transmitter is included in a base station 110, the transmitter may perform the encoding operation using transmit processor 220, receive processor 238, controller/processor 240, memory 242, or another component. When the transmitter is included in a UE 120, the transmitter may perform the encoding operation using receive processor 258, transmit processor 264, controller/processor 280, memory 282, or another component.

As further shown in FIG. 4, in some aspects, process 400 may include broadcasting the first set of network coding encoded packets for reception by a plurality of receivers (block 430). For example, the transmitter may broadcast the first set of network coding encoded packets for reception by a plurality of receivers, as described above. When the transmitter is included in a base station 110, the transmitter may broadcast the first set of network coding encoded packets using transmit processor 220, controller/processor 240, memory 242, or another component. When the transmitter is included in a UE 120, the transmitter may broadcast the first set of network coding encoded packets using transmit processor 264, controller/processor 280, memory 282, or another component.

As further shown in FIG. 4, in some aspects, process 400 may include receiving, from the plurality of receivers, feedback information associated with the first set of network coding encoded packets, the feedback information indicating that one or more receivers of the plurality of receivers did not successfully receive a quantity of network coding encoded packets that satisfies a decoding threshold associated with recovering the plurality of source packets, the feedback information further indicating a first subset of network coding encoded packets of the first set of network coding encoded packets that were not successfully received by at least one receiver of the plurality of receivers (block 440). For example, the transmitter may receive, from the plurality of receivers, feedback information associated with the first set of network coding encoded packets, the feedback information indicating that one or more receivers of the plurality of receivers did not successfully receive a quantity of network coding encoded packets that satisfies a decoding threshold associated with recovering the plurality of source packets, the feedback information further indicating a first subset of network coding encoded packets of the first set of network coding encoded packets that were not successfully received by at least one receiver of the plurality of receivers, as described above. When the transmitter is included in a base station 110, the transmitter may receive the feedback information using receive processor 238, controller/processor 240, memory 242, or another component. When the transmitter is included in a UE 120, the transmitter may receive the feedback information using receive processor 258, controller/processor 280, memory 282, or another component.

As further shown in FIG. 4, in some aspects, process 400 may optionally include determining, based at least in part on the feedback information, that one or more receivers of the plurality of receivers have not received a quantity of network coding encoded packets that satisfies a decoding threshold associated with recovering the plurality of source packets (block 450). For example, the transmitter may determine, based at least in part on the feedback information, that one or more receivers of the plurality of receivers have not received a quantity of network coding encoded packets that satisfies a decoding threshold associated with recovering the plurality of source packets, as described above. When the transmitter is included in a base station 110, the transmitter may determine that one or more receivers of the plurality of receivers have not received a quantity of network coding encoded packets that satisfies a decoding threshold using transmit processor 220, receive processor 238, controller/processor 240, memory 242, or another component. When the transmitter is included in a UE 120, the transmitter may determine that one or more receivers of the plurality of receivers have not received a quantity of network coding encoded packets that satisfies a decoding threshold using receive processor 258, transmit processor 264, controller/processor 280, memory 282, or another component.

As further shown in FIG. 4, in some aspects, process 400 may optionally include identifying, based at least in part on the feedback information, the first subset of network coding encoded packets of the first set of network coding encoded packets, the first subset of network coding encoded packets including only network coding encoded packets that were not successfully received by at least one receiver of the plurality of receivers (block 460). For example, the transmitter may identify, based at least in part on the feedback information, the first subset of network coding encoded packets of the first set of network coding encoded packets, the first subset of network coding encoded packets including only network coding encoded packets that were not successfully received by at least one receiver of the plurality of receivers, as described above. When the transmitter is included in a base station 110, the transmitter may identify the set of missed network coding encoded packets using transmit processor 220, receive processor 238, controller/processor 240, memory 242, or another component. When the transmitter is included in a UE 120, the transmitter may identify the set of missed network coding encoded packets using receive processor 258, transmit processor 264, controller/processor 280, memory 282, or another component.

As further shown in FIG. 4, in some aspects, process 400 may include broadcasting a second set of network coding encoded packets for reception by at least the one or more receivers based on the feedback information indicating that the one or more receivers did not receive the quantity of network coding encoded packets that satisfies the decoding threshold, the second set of network coding encoded packets including at least the first subset of network coding encoded packets that were not successfully received by at least one receiver of the plurality of receivers (block 470). For example, the transmitter may broadcast a second set of network coding encoded packets for reception by at least the one or more receivers based on the feedback information indicating that the one or more receivers did not receive the quantity of network coding encoded packets that satisfies the decoding threshold, the second set of network coding encoded packets including at least the first subset of network coding encoded packets that were not successfully received by at least one receiver of the plurality of receivers, as described above. When the transmitter is included in a base station 110, the transmitter may broadcast the second set of network coding encoded packets using transmit processor 220, controller/processor 240, memory 242, or another component. When the transmitter is included in a UE 120, the transmitter may broadcast the second set of network coding encoded packets using transmit processor 264, controller/processor 280, memory 282, or another component.

Process 400 may include additional aspects, such as any single aspect or any combination of aspects described below or in connection with one or more other processes described elsewhere herein.

In a first aspect, the second set of network coding encoded packets includes one or more network coding encoded packets generated by the performing of the encoding operation on the plurality of source packets.

In a second additional aspect, alone or in combination with the first aspect, the feedback information identifies one or more network coding encoded packets, from the first set of network coding encoded packets, missed by a receiver of the plurality of receivers.

In a third additional aspect, alone or in combination with one or more of the first and second aspects, the feedback information indicates a total quantity of unique network coding encoded packets received by a receiver of the one or more receivers, and the feedback information indicates that the total quantity of unique network coding network coding encoded packets received by the receiver is less than the decoding threshold.

In a fourth additional aspect, alone or in combination with one or more of the first through third aspects, the feedback information indicates the total quantity of unique network coding encoded packets received by the receiver based at least in part on stored information associated with a quantity of unique network coding encoded packets previously received by the receiver.

In a fifth additional aspect, alone or in combination with one or more of the first through fourth aspects, the feedback information indicates network coding encoded packets of the first set of network coding encoded packets that were missed by each of the plurality of receivers, where the first subset of network coding encoded packets includes only network coding encoded packets that were missed by each of the plurality of receivers.

In a sixth additional aspect, alone or in combination with one or more of the first through fifth aspects, the feedback information indicates a particular quantity of most frequently missed network coding encoded packets of the first set of network coding encoded packets that were missed by at least one receiver of the plurality of receivers, and the first subset of network coding encoded packets includes no more than the particular quantity of most frequently missed network coding encoded packets.

In a seventh additional aspect, alone or in combination with one or more of the first through sixth aspects, the feedback information indicates a subset of network coding encoded packets for each receiver of the plurality of receivers based at least in part on stored information indicating network coding encoded packets previously missed by each receiver of the plurality of receivers.

In an eighth additional aspect, alone or in combination with one or more of the first through seventh aspects, the feedback information is first feedback information, and process 400 includes receiving second feedback information associated with the second set of network coding encoded packets, the second feedback information indicating that each of the plurality of receivers has received the quantity of network coding encoded packets that satisfies the decoding threshold, and ceasing broadcasting of network coding encoded packets associated with the plurality of source packets.

In a ninth additional aspect, alone or in combination with one or more of the first through eighth aspects, process 400 includes transmitting an indication of a set of network coding parameters for reception by the plurality of receivers, the set of network coding parameters including one or more parameters associated with generating network coding encoded packets or decoding network coding encoded packets.

In a tenth additional aspect, alone or in combination with one or more of the first through ninth aspects, a set of network coding parameters is configured on the transmitter and each receiver of the plurality of receivers, the set of network coding parameters including one or more parameters associated with generating network coding encoded packets or decoding network coding encoded packets.

In an eleventh additional aspect, alone or in combination with one or more of the first through tenth aspects, the one or more parameters include an indication of at least one of the decoding threshold, a network coding algorithm, an encoding function, an encoding matrix, or a maximum quantity of decoding iterations.

In a twelfth additional aspect, alone or in combination with one or more of the first through eleventh aspects, process 400 includes transmitting an indication of the set of network coding parameters to the plurality of receivers via at least one of a MAC control element, downlink control information, or a radio resource control configuration.

In a thirteenth additional aspect, alone or in combination with one or more of the first through twelfth aspects, process 400 includes receiving a request for a new set of network coding parameters from a receiver of the plurality of receivers; and transmitting an indication of the set of network coding parameters to the plurality of receivers based at least in part on the request for a new set of network coding parameters.

In a fourteenth additional aspect, alone or in combination with one or more of the first through thirteenth aspects, the request for the new set of network coding parameters is based at least in part on the receiver identifying underperforming decoding or recovery at the receiver.

In a fifteenth additional aspect, alone or in combination with one or more of the first through fourteenth aspects, the request for the new set of network coding parameters is received via at least one of a MAC control element or uplink control information.

In a sixteenth additional aspect, alone or in combination with one or more of the first through fifteenth aspects, the set of network coding parameters is one of a plurality of sets of network coding parameters configured on the transmitter and each receiver of the plurality of receivers.

In a seventeenth additional aspect, alone or in combination with one or more of the first through sixteenth aspects, process 400 includes receiving a request to switch a used set of network coding parameters from a receiver of the plurality of receivers; and transmitting an indication to use the set of network coding parameters to the plurality of receivers based at least in part on the request to switch the used set of network coding parameters.

In an eighteenth additional aspect, alone or in combination with one or more of the first through seventeenth aspects, the request to switch the used set of network coding parameters is based at least in part on the receiver identifying underperforming decoding or recovery at the receiver.

In a nineteenth additional aspect, alone or in combination with one or more of the first through eighteenth aspects, the request to switch the used set of network coding parameters is received via at least one of a MAC control element or uplink control information.

In a twentieth additional aspect, alone or in combination with one or more of the first through nineteenth aspects, the feedback information includes CSI report information associated with a receiver of the plurality of receivers.

In a twenty first additional aspect, alone or in combination with one or more of the first through twentieth aspects, process 400 includes selecting an MCS or a based at least in part on the CSI report information.

Although FIG. 4 shows example blocks of process 400, in some aspects, process 400 may include additional blocks, fewer blocks, different blocks, or differently arranged blocks than those depicted in FIG. 4. Additionally or alternatively, two or more of the blocks of process 400 may be performed in parallel.

Figure 5:
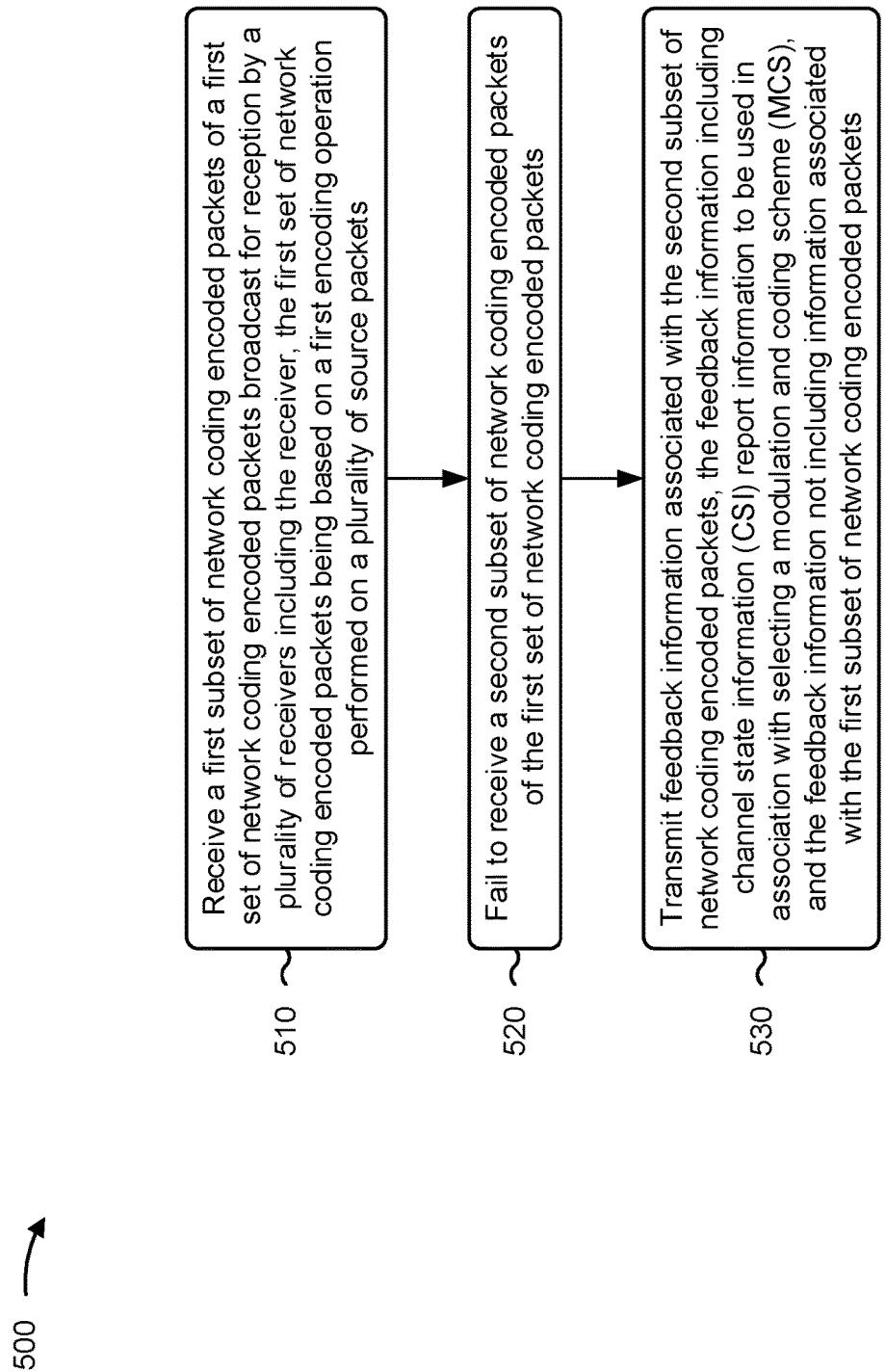
FIG. 5 is a flowchart illustrating an example process associated with providing feedback information associated with a set of network coding encoded packets including a channel state information report, in accordance with the present disclosure.

FIG. 5 is a flowchart illustrating an example process 500 performed, for example, by a receiver in accordance with the present disclosure. Example process 500 is an example where the receiver (for example, base station 110, UE 120, among other examples) performs operations associated with feedback-based retransmission of broadcast network coding encoded packets.

As shown in FIG. 5, in some aspects, process 500 may include receiving a first subset of network coding encoded packets of a first set of network coding encoded packets broadcast for reception by a plurality of receivers including the receiver, the first set of network coding encoded packets being based on a first encoding operation performed on a plurality of source packets (block 510). For example, the receiver may receive a first subset of network coding encoded packets of a first set of network coding encoded packets broadcast for reception by a plurality of receivers including the receiver, the first set of network coding encoded packets being based on a first encoding operation performed on a plurality of source packets, as described above. When the receiver is included in a base station 110, the receiver may receive the first set of network coding encoded packets using receive processor 238, controller/processor 240, memory 242, or another component. When the receiver is included in a UE 120, the receiver may receive the first set of network coding encoded packets using receive processor 258, controller/processor 280, memory 282, or another component.

As shown in FIG. 5, in some aspects, process 500 may include failing to receive a second subset of network coding encoded packets of the first set of network coding encoded packets (block 520). For example, the receiver may fail to receive a second subset of network coding encoded packets of the first set of network coding encoded packets, as described above. When the receiver is included in a base station 110, the receiver may receive the first set of network coding encoded packets using receive processor 238, controller/processor 240, memory 242, or another component. When the receiver is included in a UE 120, the receiver may receive the first set of network coding encoded packets using receive processor 258, controller/processor 280, memory 282, or another component.

As further shown in FIG. 5, in some aspects, process 500 may include transmitting feedback information associated with the second subset of network coding encoded packets, the feedback information including CSI report information to be used in association with selecting an MCS, and the feedback information not including information associated with the first subset of network coding encoded packets (block 530). For example, the receiver may transmit feedback information associated with the second subset of network coding encoded packets, the feedback information including CSI report information to be used in association with selecting an MCS, and the feedback information not including information associated with the first subset of network coding encoded packets as described above. When the receiver is included in a base station 110, the receiver may transmit the feedback information using transmit processor 220 controller/processor 240, memory 242, or another component. When the receiver is included in a UE 120, the receiver may transmit the feedback information using transmit processor 264, controller/processor 280, memory 282, or another component.

Process 500 may include additional aspects, such as any single aspect or any combination of aspects described below or in connection with one or more other processes described elsewhere herein.

In a first aspect, process 500 includes determining to include the CSI report information in the feedback information based at least in part on including a negative acknowledgment associated with the second subset of network coding encoded packets in the feedback information.

In a second additional aspect, alone or in combination with the first aspect, the feedback information identifies the second subset of network coding encoded packets failed to be received by the receiver.

In a third additional aspect, alone or in combination with one or more of the first and second aspects, process 500 includes receiving an indication of a set of network coding parameters, the set of network coding parameters including one or more parameters associated with generating network coding encoded packets or decoding network coding encoded packets.

In a fourth additional aspect, alone or in combination with one or more of the first through third aspects, a set of network coding parameters is configured on the receiver, the set of network coding parameters including one or more parameters associated with generating network coding encoded packets or decoding network coding encoded packets.

In a fifth additional aspect, alone or in combination with one or more of the first through fourth aspects, the one or more parameters include an indication of at least one of a decoding threshold associated with recovering the plurality of source packets, a network coding algorithm, an encoding function, an encoding matrix, or a maximum quantity of decoding iterations.

In a sixth additional aspect, alone or in combination with one or more of the first through fifth aspects, process 500 includes receiving an indication of the set of network coding parameters via at least one of a MAC control element, downlink control information, or a radio resource control configuration.

In a seventh additional aspect, alone or in combination with one or more of the first through sixth aspects, process 500 includes receiving an indication of the set of network coding parameters based at least in part on a request for a new set of network coding parameters, the request being transmitted by the receiver or another receiver of the plurality of receivers.

In an eighth additional aspect, alone or in combination with one or more of the first through seventh aspects, the request for the new set of network coding parameters is transmitted based at least in part on identifying underperforming decoding or recovery.

In a ninth additional aspect, alone or in combination with one or more of the first through eighth aspects, the request for the new set of network coding parameters is transmitted via at least one of a MAC control element or uplink control information.

In a tenth additional aspect, alone or in combination with one or more of the first through ninth aspects, the set of network coding parameters is one of a plurality of sets of network coding parameters configured on the receiver.

In an eleventh additional aspect, alone or in combination with one or more of the first through tenth aspects, process 500 includes receiving an indication to use the set of network coding parameters based at least in part on a request to switch a used set of network coding parameters, the request being transmitted by the receiver or another receiver of the plurality of receivers.

In a twelfth additional aspect, alone or in combination with one or more of the first through eleventh aspects, the request to switch the used set of network coding parameters is transmitted based at least in part on identifying underperforming decoding or recovery.

In a thirteenth additional aspect, alone or in combination with one or more of the first through twelfth aspects, the request to switch the used set of network coding parameters is transmitted via at least one of a MAC control element or uplink control information.

Although FIG. 5 shows example blocks of process 500, in some aspects, process 500 may include additional blocks, fewer blocks, different blocks, or differently arranged blocks than those depicted in FIG. 5. Additionally or alternatively, two or more of the blocks of process 500 may be performed in parallel.

Figure 6:
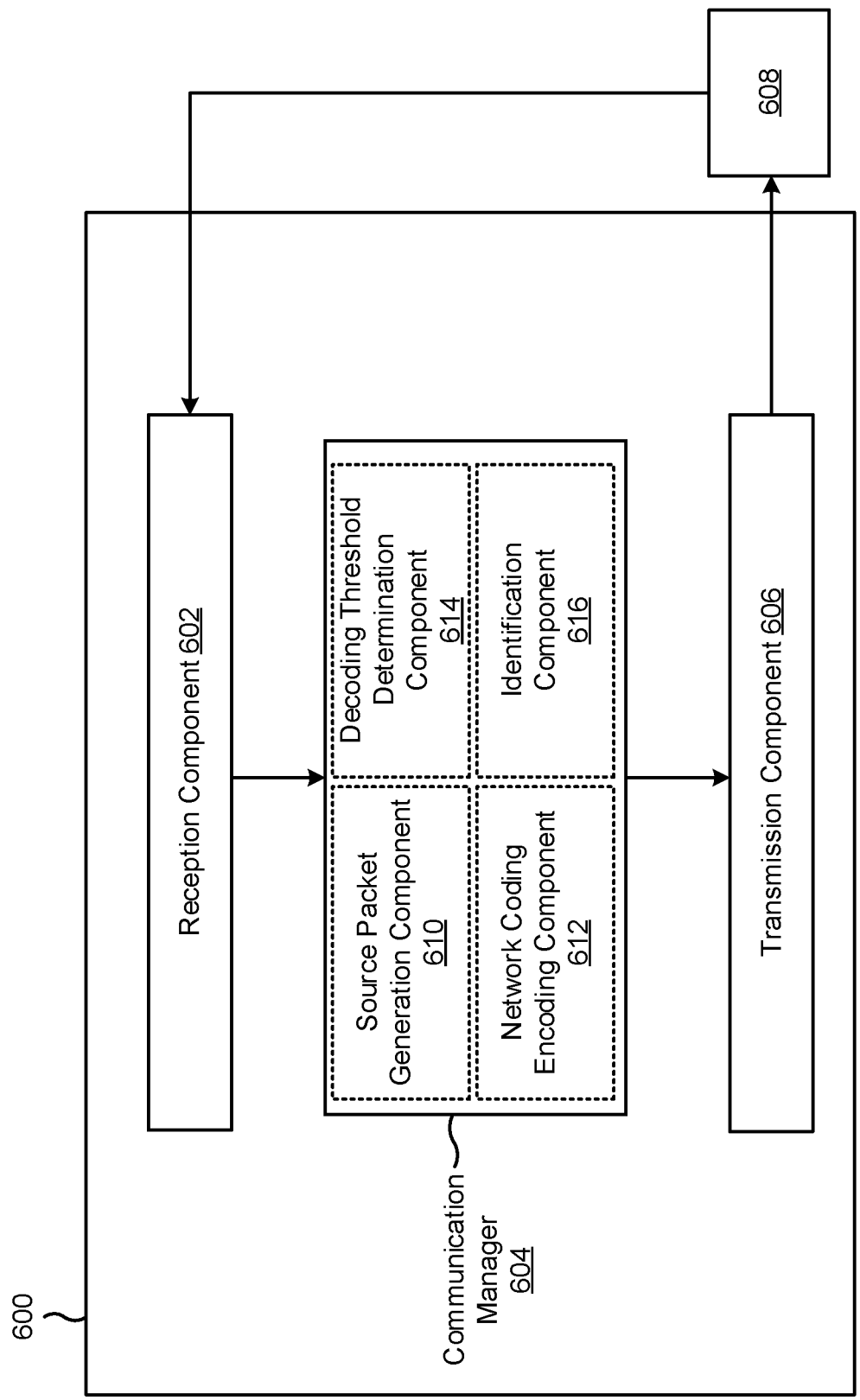

FIG. 6 is a block diagram of an example apparatus 600 for wireless communication in accordance with the present disclosure. The apparatus 600 may be a transmitter, or a transmitter may include the apparatus 600. In some aspects, the apparatus 600 includes a reception component 602, a communication manager 604, and a transmission component 606, which may be in communication with one another (for example, via one or more buses). As shown, the apparatus 600 may communicate with another apparatus 608 (such as a UE, a base station, or another wireless communication device) using the reception component 602 and the transmission component 606.

In some aspects, the apparatus 600 may be configured to perform one or more operations described herein in connection with FIGS. 3A and 3B. Additionally or alternatively, the apparatus 600 may be configured to perform one or more processes described herein, such as process 400 of FIG. 4. In some aspects, the apparatus 600 may include one or more components of the transmitter described above in connection with FIG. 2.

The reception component 602 may receive communications, such as reference signals, control information, data communications, or a combination thereof, from the apparatus 608. The reception component 602 may provide received communications to one or more other components of the apparatus 600, such as the communication manager 604. In some aspects, the reception component 602 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components. In some aspects, the reception component 602 may include one or more antennas, a demodulator, a MIMO detector, a receive processor, a controller/processor, a memory, or a combination thereof, of the transmitter described above in connection with FIG. 2.

The transmission component 606 may transmit communications, such as reference signals, control information, data communications, or a combination thereof, to the apparatus 608. In some aspects, the communication manager 604 may generate communications and may transmit the generated communications to the transmission component 606 for transmission to the apparatus 608. In some aspects, the transmission component 606 may perform signal processing on the generated communications (such as filtering, amplification, modulation, digital-to-analog conversion, multiplexing, interleaving, mapping, or encoding, among other examples), and may transmit the processed signals to the apparatus 608. In some aspects, the transmission component 606 may include one or more antennas, a modulator, a transmit MIMO processor, a transmit processor, a controller/processor, a memory, or a combination thereof, of the transmitter described above in connection with FIG. 2. In some aspects, the transmission component 606 may be co-located with the reception component 602 in a transceiver.

The communication manager 604 may generate a plurality of source packets. The communication manager 604 may perform a first encoding operation on the plurality of source packets that generates a first set of network coding encoded packets. The communication manager 604 may broadcast or may cause the transmission component 606 to broadcast the first set of network coding encoded packets for reception by a plurality of receivers. The communication manager 604 may receive or may cause the reception component 602 to receive, from the plurality of receivers, feedback information associated with the first set of network coding encoded packets, the feedback information indicating that one or more receivers of the plurality of receivers did not successfully receive a quantity of network coding encoded packets that satisfies a decoding threshold associated with recovering the plurality of source packets, the feedback information further indicating a first subset of network coding encoded packets of the first set of network coding encoded packets that were not successfully received by at least one receiver of the plurality of receivers. In some aspects, the communication manager 604 may determine, based at least in part on the feedback information, that one or more receivers of the plurality of receivers have not received a quantity of network coding encoded packets that satisfies a decoding threshold associated with recovering the plurality of source packets. In some aspects, the communication manager 604 may identify, based at least in part on the feedback information, the first subset of network coding encoded packets of the first set of network coding encoded packets, the first subset of network coding encoded packets including only network coding encoded packets that were not successfully received by at least one receiver of the plurality of receivers. The communication manager 604 may broadcast or may cause the transmission component 606 to broadcast a second set of network coding encoded packets for reception by at least the one or more receivers based on the feedback information indicating that the one or more receivers did not receive the quantity of network coding encoded packets that satisfies the decoding threshold, the second set of network coding encoded packets including at least the first subset of network coding encoded packets that were not successfully received by at least one receiver of the plurality of receivers. In some aspects, the communication manager 604 may include a controller/processor, a memory, a scheduler, a communication unit, or a combination thereof, of the transmitter described above in connection with FIG. 2.

In some aspects, the communication manager 604 may include a set of components, such as a source packet generation component 610, a network coding encoding component 612, a decoding threshold determination component 614, an identification component 616, or a combination thereof. Alternatively, the set of components may be separate and distinct from the communication manager 604. In some aspects, one or more components of the set of components may include or may be implemented within a controller/processor, a memory, a scheduler, a communication unit, or a combination thereof, of the transmitter described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

In some aspects, the source packet generation component 610 may generate a plurality of source packets. In some aspects, the network coding encoding component 612 may perform a first encoding operation on the plurality of source packets that generates a first set of network coding encoded packets. In some aspects, the transmission component 606 may broadcast the first set of network coding encoded packets for reception by a plurality of receivers. In some aspects, the reception component 602 may receive, from the plurality of receivers, feedback information associated with the first set of network coding encoded packets. In some aspects, the feedback information may indicate that one or more receivers of the plurality of receivers did not successfully receive a quantity of network coding encoded packets that satisfies a decoding threshold associated with recovering the plurality of source packets. In some aspects, the feedback information may further indicate a first subset of network coding encoded packets of the first set of network coding encoded packets that were not successfully received by at least one receiver of the plurality of receivers. In some aspects, the decoding threshold determination component 614 may determine, based at least in part on the feedback information, that one or more receivers of the plurality of receivers have not received a quantity of network coding encoded packets that satisfies a decoding threshold associated with recovering the plurality of source packets. In some aspects, the identification component 616 may identify, based at least in part on the feedback information, the first subset of network coding encoded packets of the first set of network coding encoded packets, the first subset of network coding encoded packets including only network coding encoded packets that were not successfully received by at least one receiver of the plurality of receivers. In some aspects, the transmission component 606 may broadcast a second set of network coding encoded packets for reception by at least the one or more receivers based on the feedback information indicating that the one or more receivers did not receive the quantity of network coding encoded packets that satisfies the decoding threshold, the second set of network coding encoded packets including at least the first subset of network coding encoded packets.

In some aspects, the decoding threshold determination component 614, when determining that the one or more receivers have not received the quantity of network coding encoded packets that satisfies the decoding threshold, may identify a total quantity of unique network coding encoded packets received by the receiver based at least in part on the feedback information, and determine that the total quantity of unique network coding network coding encoded packets received by the receiver is less than the decoding threshold.

In some aspects, the identification component 616, when identifying the set of missed network coding encoded packets of the first set of network coding encoded packets based at least in part on the feedback information, may identify network coding encoded packets of the first set of network coding encoded packets that were missed by all of the plurality of receivers, where the identified set of missed network coding encoded packets includes only network coding encoded packets that were missed by all of the plurality of receivers.

In some aspects, the identification component 616, when identifying the set of missed network coding encoded packets of the first set of network coding encoded packets based at least in part on the feedback information, may identify a particular quantity of most frequently missed network coding encoded packets of the first set of network coding encoded packets that were missed by at least one receiver of the plurality of receivers, where the identified set of missed network coding encoded packets includes no more than the particular quantity of most frequently missed network coding encoded packets.

In some aspects, the feedback information is first feedback information, and the reception component 602 receives second feedback information associated with the second set of network coding encoded packets. In some aspects, the decoding threshold determination component 614 determines, based at least in part on the second feedback information, that each of the plurality of receivers has received the quantity of network coding encoded packets that satisfies the decoding threshold. In some aspects, the transmission component 606 ceases broadcasting of network coding encoded packets associated with the plurality of source packets.

In some aspects, the transmission component 606 transmits an indication of a set of network coding parameters for reception by the plurality of receivers, the set of network coding parameters including one or more parameters associated with generating network coding encoded packets or decoding network coding encoded packets.

The quantity and arrangement of components shown in FIG. 6 are provided as an example. In practice, there may be additional components, fewer components, different components, or differently arranged components than those shown in FIG. 6. Furthermore, two or more components shown in FIG. 6 may be implemented within a single component, or a single component shown in FIG. 6 may be implemented as multiple, distributed components. Additionally or alternatively, a set of (one or more) components shown in FIG. 6 may perform one or more functions described as being performed by another set of components shown in FIG. 6.

FIG. 7 is a block diagram of an example apparatus 700 for wireless communication in accordance with the present disclosure. The apparatus 700 may be a receiver, or a receiver may include the apparatus 700. In some aspects, the apparatus 700 includes a reception component 702, a communication manager 704, and a transmission component 706, which may be in communication with one another (for example, via one or more buses). As shown, the apparatus 700 may communicate with another apparatus 708 (such as a UE, a base station, or another wireless communication device) using the reception component 702 and the transmission component 706.

In some aspects, the apparatus 700 may be configured to perform one or more operations described herein in connection with FIGS. 3A and 3B. Additionally or alternatively, the apparatus 700 may be configured to perform one or more processes described herein, such as process 500 of FIG. 5. In some aspects, the apparatus 700 may include one or more components of the receiver described above in connection with FIG. 2.

The reception component 702 may receive communications, such as reference signals, control information, data communications, or a combination thereof, from the apparatus 708. The reception component 702 may provide received communications to one or more other components of the apparatus 700, such as the communication manager 704. In some aspects, the reception component 702 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components. In some aspects, the reception component 702 may include one or more antennas, a demodulator, a MIMO detector, a receive processor, a controller/processor, a memory, or a combination thereof, of the receiver described above in connection with FIG. 2.

The transmission component 706 may transmit communications, such as reference signals, control information, data communications, or a combination thereof, to the apparatus 708. In some aspects, the communication manager 704 may generate communications and may transmit the generated communications to the transmission component 706 for transmission to the apparatus 708. In some aspects, the transmission component 706 may perform signal processing on the generated communications (such as filtering, amplification, modulation, digital-to-analog conversion, multiplexing, interleaving, mapping, or encoding, among other examples), and may transmit the processed signals to the apparatus 708. In some aspects, the transmission component 706 may include one or more antennas, a modulator, a transmit MIMO processor, a transmit processor, a controller/processor, a memory, or a combination thereof, of the receiver described above in connection with FIG. 2. In some aspects, the transmission component 706 may be co-located with the reception component 702 in a transceiver.

The communication manager 704 may receive or may cause the reception component 702 to receive a first subset of network coding encoded packets of a first set of network coding encoded packets broadcast for reception by a plurality of receivers including the receiver, the first set of network coding encoded packets being based on a first encoding operation performed on a plurality of source packets. In some aspects, the communication manager 704 or the reception component 702 may fail to receive a second subset of network coding encoded packets of the first set of network coding encoded packets. The communication manager 704 may transmit or may cause the transmission component 706 to transmit feedback information associated with the second subset of network coding encoded packets, the feedback information including CSI report information to be used in association with selecting an MCS. In some aspects, the feedback information may not include information associated with the first subset of network coding encoded packets. In some aspects, the communication manager 704 may include a controller/processor, a memory, a scheduler, a communication unit, or a combination thereof, of the receiver described above in connection with FIG. 2.

In some aspects, the communication manager 704 may include a set of components, such as a feedback component 710. Alternatively, the set of components may be separate and distinct from the communication manager 704. In some aspects, one or more components of the set of components may include or may be implemented within a controller/processor, a memory, a scheduler, a communication unit, or a combination thereof, of the receiver described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

In some aspects, the reception component 702 may receive a first subset of network coding encoded packets of a first set of network coding encoded packets broadcast for reception by a plurality of receivers including the receiver, the first set of network coding encoded packets being based on a first encoding operation performed on a plurality of source packets. In some aspects, the reception component 702 may fail to receive a second subset of network coding encoded packets of the first set of network coding encoded packets. In some aspects, the feedback component 710 may transmit or may cause the transmission component 706 to transmit feedback information associated with the second subset of network coding encoded packets, the feedback information including CSI report information to be used in association with selecting an MCS. In some aspects, the feedback information may not include information associated with the first subset of network coding encoded packets.

In some aspects, the feedback component 710 determines to include the CSI report information in the feedback information based at least in part on including a negative acknowledgment associated with the second subset of network coding encoded packets in the feedback information.

In some aspects, reception component 702 receives an indication of a set of network coding parameters, the set of network coding parameters including one or more parameters associated with generating network coding encoded packets or decoding network coding encoded packets.

The quantity and arrangement of components shown in FIG. 7 are provided as an example. In practice, there may be additional components, fewer components, different components, or differently arranged components than those shown in FIG. 7. Furthermore, two or more components shown in FIG. 7 may be implemented within a single component, or a single component shown in FIG. 7 may be implemented as multiple, distributed components. Additionally or alternatively, a set of (one or more) components shown in FIG. 7 may perform one or more functions described as being performed by another set of components shown in FIG. 7.

The following provides an overview of some Aspects of the present disclosure:

Aspect 1: A method of wireless communication performed by a transmitter, comprising: generating a plurality of source packets; performing an encoding operation on the plurality of source packets that generates a first set of network coding encoded packets; broadcasting the first set of network coding encoded packets for reception by a plurality of receivers; receiving, from the plurality of receivers, feedback information associated with the first set of network coding encoded packets, the feedback information indicating that one or more receivers of the plurality of receivers did not successfully receive a quantity of network coding encoded packets that satisfies a decoding threshold associated with recovering the plurality of source packets, the feedback information further indicating a first subset of network coding encoded packets of the first set of network coding encoded packets that were not successfully received by at least one receiver of the plurality of receivers; and broadcasting a second set of network coding encoded packets for reception by at least the one or more receivers based on the feedback information indicating that the one or more receivers did not receive the quantity of network coding encoded packets that satisfies the decoding threshold, the second set of network coding encoded packets including at least the first subset of network coding encoded packets that were not successfully received by at least one receiver of the plurality of receivers.

Aspect 2: The method of Aspect 1, wherein the second set of network coding encoded packets includes one or more network coding encoded packets generated by the performing of the encoding operation on the plurality of source packets.

Aspect 3: The method of any of Aspects 1-2, wherein the feedback information identifies one or more network coding encoded packets, from the first set of network coding encoded packets, missed by a receiver of the plurality of receivers.

Aspect 4: The method of any of Aspects 1-3, wherein the feedback information indicates a total quantity of unique network coding encoded packets received by a receiver of the one or more receivers, and wherein the feedback information further indicates that the total quantity of unique network coding network coding encoded packets received by the receiver is less than the decoding threshold.

Aspect 5: The method of Aspect 4, wherein the feedback information indicates the total quantity of unique network coding encoded packets received by the receiver based at least in part on stored information associated with a quantity of unique network coding encoded packets previously received by the receiver.

Aspect 6: The method of any of Aspects 1-5, wherein the feedback information indicates network coding encoded packets of the first set of network coding encoded packets that were missed by each of the plurality of receivers, wherein the first subset of network coding encoded packets includes only network coding encoded packets that were missed by each of the plurality of receivers.

Aspect 7: The method of any of Aspects 1-5, wherein the feedback information indicates a particular quantity of most frequently missed network coding encoded packets of the first set of network coding encoded packets that were missed by at least one receiver of the plurality of receivers, wherein the first subset of network coding encoded packets includes no more than the particular quantity of most frequently missed network coding encoded packets.

Aspect 8: The method of any of Aspects 1-7, wherein the feedback information indicates a subset of missed network coding encoded packets for each receiver of the plurality of receivers based at least in part on stored information indicating network coding encoded packets previously missed by each receiver of the plurality of receivers.

Aspect 9: The method of any of Aspects 1-8, wherein the feedback information is first feedback information, and the method further comprises: receiving second feedback information associated with the second set of network coding encoded packets, the second feedback information indicating that each of the plurality of receivers has received the quantity of network coding encoded packets that satisfies the decoding threshold; and ceasing broadcasting of network coding encoded packets associated with the plurality of source packets.

Aspect 10: The method of any of Aspects 1-9, further comprising transmitting an indication of a set of network coding parameters for reception by the plurality of receivers, the set of network coding parameters including one or more parameters associated with generating network coding encoded packets or decoding network coding encoded packets.

Aspect 11: The method of any of Aspects 1-10, wherein a set of network coding parameters is configured on the transmitter and each receiver of the plurality of receivers, the set of network coding parameters including one or more parameters associated with generating network coding encoded packets or decoding network coding encoded packets.

Aspect 12: The method of Aspect 11, wherein the one or more parameters include an indication of at least one of the decoding threshold, a network coding algorithm, an encoding function, an encoding matrix, or a maximum quantity of decoding iterations.

Aspect 13: The method of any of Aspects 11-12, further comprising transmitting an indication of the set of network coding parameters to the plurality of receivers via at least one of a medium access control (MAC) control element (MAC-CE), downlink control information, or a radio resource control configuration.

Aspect 14: The method of any of Aspects 11-13, further comprising: receiving a request for a new set of network coding parameters from a receiver of the plurality of receivers; and transmitting an indication of the set of network coding parameters to the plurality of receivers based at least in part on the request for a new set of network coding parameters.

Aspect 15: The method of Aspect 14, wherein the request for the new set of network coding parameters is based at least in part on the receiver identifying underperforming decoding or recovery at the receiver.

Aspect 16: The method of any of Aspects 14-15, wherein the request for the new set of network coding parameters is received via at least one of a medium access control (MAC) control element (MAC-CE) or uplink control information.

Aspect 17: The method of any of Aspects 11-16, wherein the set of network coding parameters is one of a plurality of sets of network coding parameters configured on the transmitter and each receiver of the plurality of receivers.

Aspect 18: The method of Aspect 17, further comprising: receiving a request to switch a used set of network coding parameters from a receiver of the plurality of receivers; and transmitting an indication to use the set of network coding parameters to the plurality of receivers based at least in part on the request to switch the used set of network coding parameters.

Aspect 19: The method of Aspect 18, wherein the request to switch the used set of network coding parameters is based at least in part on the receiver identifying underperforming decoding or recovery at the receiver.

Aspect 20: The method of any of Aspects 18-19, wherein the request to switch the used set of network coding parameters is received via at least one of a medium access control (MAC) control element (MAC-CE) or uplink control information.

Aspect 21: The method of any of Aspects 1-20, wherein the feedback information includes channel state information (CSI) report information associated with a receiver of the plurality of receivers.

Aspect 22: The method of Aspect 21, further comprising selecting a modulation and coding scheme (MCS) based at least in part on the CSI report information.

Aspect 23: A method of wireless communication performed by a receiver, comprising: receiving a first subset of network coding encoded packets of a first set of network coding encoded packets broadcast for reception by a plurality of receivers including the receiver, the first set of network coding encoded packets being based on a first encoding operation performed on a plurality of source packets; failing to receive a second subset of network coding encoded packets of the first set of network coding encoded packets; and transmitting feedback information associated with the second subset of network coding encoded packets, the feedback information including channel state information (CSI) report information to be used in association with selecting a modulation and coding scheme (MCS), and the feedback information not including information associated with the first subset of network coding encoded packets.

Aspect 24: The method of Aspect 23, further comprising determining to include the CSI report information in the feedback information based at least in part on including a negative acknowledgment associated with the second subset of network coding encoded packets in the feedback information.

Aspect 25: The method of any of Aspects 23-24, wherein the feedback information identifies the second subset of network coding encoded packets failed to be received by the receiver.

Aspect 26: The method of any of Aspects 23-25, further comprising receiving an indication of a set of network coding parameters, the set of network coding parameters including one or more parameters associated with generating network coding encoded packets or decoding network coding encoded packets.

Aspect 27: The method of any of Aspects 23-26, wherein a set of network coding parameters is configured on the receiver, the set of network coding parameters including one or more parameters associated with generating network coding encoded packets or decoding network coding encoded packets.

Aspect 28: The method of Aspect 27, wherein the one or more parameters include an indication of at least one of a decoding threshold associated with recovering the plurality of source packets, a network coding algorithm, an encoding function, an encoding matrix, or a maximum quantity of decoding iterations.

Aspect 29: The method of any of Aspects 27-28, further comprising receiving an indication of the set of network coding parameters via at least one of a medium access control (MAC) control element (MAC-CE), downlink control information, or a radio resource control configuration.

Aspect 30: The method of any of Aspects 27-29, further comprising receiving an indication of the set of network coding parameters based at least in part on a request for a new set of network coding parameters, the request being transmitted by the receiver or another receiver of the plurality of receivers.

Aspect 31: The method of Aspect 30, wherein the request for the new set of network coding parameters is transmitted based at least in part on identifying underperforming decoding or recovery.

Aspect 32: The method of any of Aspects 30-31, wherein the request for the new set of network coding parameters is transmitted via at least one of a medium access control (MAC) control element (MAC-CE) or uplink control information.

Aspect 33: The method of any of Aspects 27-32, wherein the set of network coding parameters is one of a plurality of sets of network coding parameters configured on the receiver.

Aspect 34: The method of Aspect 33, further comprising receiving an indication to use the set of network coding parameters based at least in part on a request to switch a used set of network coding parameters, the request being transmitted by the receiver or another receiver of the plurality of receivers.

Aspect 35: The method of Aspect 34, wherein the request to switch the used set of network coding parameters is transmitted based at least in part on identifying underperforming decoding or recovery.

Aspect 36: The method of any of Aspects 34-35, wherein the request to switch the used set of network coding parameters is transmitted via at least one of a medium access control (MAC) control element (MAC-CE) or uplink control information.

Aspect 37: An apparatus for wireless communication at a device, comprising a processor; memory coupled with the processor; and instructions stored in the memory and executable by the processor to cause the apparatus to perform the method of one or more of Aspects 1-22.

Aspect 38: A device for wireless communication, comprising a memory and one or more processors coupled to the memory, the one or more processors configured to perform the method of one or more of Aspects 1-22.

Aspect 39: An apparatus for wireless communication, comprising at least one means for performing the method of one or more of Aspects 1-22.

Aspect 40: A non-transitory computer-readable medium storing code for wireless communication, the code comprising instructions executable by a processor to perform the method of one or more of Aspects 1-22.

Aspect 41: A non-transitory computer-readable medium storing a set of instructions for wireless communication, the set of instructions comprising one or more instructions that, when executed by one or more processors of a device, cause the device to perform the method of one or more of Aspects 1-22.

Aspect 42: An apparatus for wireless communication at a device, comprising a processor; memory coupled with the processor; and instructions stored in the memory and executable by the processor to cause the apparatus to perform the method of one or more of Aspects 23-36.

Aspect 43: A device for wireless communication, comprising a memory and one or more processors coupled to the memory, the one or more processors configured to perform the method of one or more of Aspects 23-36.

Aspect 44: An apparatus for wireless communication, comprising at least one means for performing the method of one or more of Aspects 23-36.

Aspect 39: A non-transitory computer-readable medium storing code for wireless communication, the code comprising instructions executable by a processor to perform the method of one or more of Aspects 23-36.

Aspect 40: A non-transitory computer-readable medium storing a set of instructions for wireless communication, the set of instructions comprising one or more instructions that, when executed by one or more processors of a device, cause the device to perform the method of one or more of Aspects 23-36.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware, firmware, or a combination of hardware and software. As used herein, a processor is implemented in hardware, firmware, or a combination of hardware and software. It will be apparent that systems or methods described herein may be implemented in different forms of hardware, firmware, or a combination of hardware and software. The actual specialized control hardware or software code used to implement these systems or methods is not limiting of the aspects. Thus, the operation and behavior of the systems or methods were described herein without reference to specific software code—it being understood that software and hardware can be designed to implement the systems or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, or not equal to the threshold, among other examples.

Even though particular combinations of features are recited in the claims or disclosed in the specification, these combinations are not intended to limit the disclosure of various aspects. In fact, many of these features may be combined in ways not specifically recited in the claims or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (for example, a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (for example, related items, unrelated items, or a combination of related and unrelated items), and may be used interchangeably with "one or more." Where only one item is intended, the phrase "only one" or similar language is used. Also, as used herein, the terms "has," "have," "having," and similar terms are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (for example, if used in combination with "either" or "only one of").

What is claimed is:

1. A transmitter for wireless communication, comprising:
   at least one memory; and
   at least one processor, coupled with the at least one memory, the at least one processor configured to cause the transmitter to:
   generate a plurality of source packets;
   perform an encoding operation on the plurality of source packets that generates a first set of network coding encoded packets;
   broadcast the first set of network coding encoded packets for reception by a plurality of receivers;
   receive, from the plurality of receivers, feedback information associated with the first set of network coding encoded packets, the feedback information indicating that each of one or more receivers of the plurality of receivers did not successfully receive a quantity of network coding encoded packets that satisfies a decoding threshold associated with recovering the plurality of source packets, the feedback information further indicating a first subset of network coding encoded packets of the first set of network coding encoded packets, each network coding encoded packet in the first subset of network coding encoded packets being not successfully received by one or more respective receivers of the plurality of receivers, the one or more respective receivers not successfully receiving a respective network coding encoded packet in the first subset of network coding encoded packets being the same or different than the one or more respective receivers of the plurality of receivers not successfully receiving another network coding encoded packet in the first subset of network coding encoded packets; and
   broadcast a second set of network coding encoded packets for reception by at least the one or more receivers based on the feedback information indicating that the one or more receivers did not receive the quantity of network coding encoded packets that satisfies the decoding threshold, the second set of network coding encoded packets including at least the first subset of network coding encoded packets.

2. The transmitter of claim 1, wherein the second set of network coding encoded packets includes one or more network coding encoded packets generated by the performing of the encoding operation on the plurality of source packets.

3. The transmitter of claim 1, wherein the feedback information further indicates a total quantity of unique network coding encoded packets received by a receiver of the one or more receivers, and wherein the feedback information further indicates that the total quantity of unique network coding network coding encoded packets received by the receiver is less than the decoding threshold.

4. The transmitter of claim 3, wherein the feedback information indicates the total quantity of unique network coding encoded packets received by the receiver based at least in part on stored information associated with a quantity of unique network coding encoded packets previously received by the receiver.

5. The transmitter of claim 1, wherein the feedback information further indicates network coding encoded packets of the first set of network coding encoded packets that were missed by each of the plurality of receivers, and wherein the second set of network coding encoded packets includes only the network coding encoded packets that were missed by each of the plurality of receivers.

6. The transmitter of claim 1, wherein the feedback information further indicates a particular quantity of most frequently missed network coding encoded packets of the first set of network coding encoded packets that were missed by at least one receiver of the plurality of receivers, and wherein the first subset of network coding encoded packets includes no more than the particular quantity of most frequently missed network coding encoded packets.

7. The transmitter of claim 1, wherein the feedback information further indicates a subset of missed network coding encoded packets for each receiver of the plurality of receivers based at least in part on stored information indicating network coding encoded packets previously missed by each receiver of the plurality of receivers.

8. The transmitter of claim 1, wherein the feedback information is first feedback information, and
wherein the at least one processors is further configured to cause the transmitter to:
receive second feedback information associated with the second set of network coding encoded packets, the second feedback information indicating that each of the plurality of receivers has received the quantity of network coding encoded packets that satisfies the decoding threshold; and
cease broadcasting of network coding encoded packets associated with the plurality of source packets.

9. The transmitter of claim 1, wherein the at least one processor is further configured to cause the transmitter to transmit an indication of a set of network coding parameters for reception by the plurality of receivers, the set of network coding parameters including one or more parameters associated with generating network coding encoded packets or decoding network coding encoded packets.

10. The transmitter of claim 1, wherein a set of network coding parameters is configured on the transmitter and each receiver of the plurality of receivers, the set of network coding parameters including one or more parameters associated with generating network coding encoded packets or decoding network coding encoded packets.

11. The transmitter of claim 10, wherein the at least one processor is further configured to cause the transmitter to:
receive a request for a new set of network coding parameters from a receiver of the plurality of receivers; and
transmit an indication of the set of network coding parameters to the plurality of receivers based at least in part on the request for a new set of network coding parameters.

12. The transmitter of claim 10, wherein the at least one processor is further configured to cause the transmitter to:
receive a request to switch a used set of network coding parameters from a receiver of the plurality of receivers; and
transmit an indication to use the set of network coding parameters to the plurality of receivers based at least in part on the request to switch the used set of network coding parameters.

13. The transmitter of claim 1, wherein the feedback information includes channel state information (CSI) report information associated with a receiver of the plurality of receivers.

14. A method of wireless communication performed by a transmitter, comprising:
generating a plurality of source packets;
performing an encoding operation on the plurality of source packets that generates a first set of network coding encoded packets;
broadcasting the first set of network coding encoded packets for reception by a plurality of receivers;
receiving, from the plurality of receivers, feedback information associated with the first set of network coding encoded packets, the feedback information indicating that each of one or more receivers of the plurality of receivers did not successfully receive a quantity of network coding encoded packets that satisfies a decoding threshold associated with recovering the plurality of source packets, the feedback information further indicating a first subset of network coding encoded packets of the first set of network coding encoded packets, each network coding encoded packet in the first subset of network coding encoded packets being not successfully received by one or more respective receivers of the plurality of receivers, the one or more respective receivers not successfully receiving a respective network coding encoded packet in the first subset of network coding encoded packets being the same or different than the one or more respective receivers of the plurality of receivers not successfully receiving another network coding encoded packet in the first subset of network coding encoded packets; and
broadcasting a second set of network coding encoded packets for reception by at least the one or more receivers based on the feedback information indicating that the one or more receivers did not receive the quantity of network coding encoded packets that satisfies the decoding threshold, the second set of network coding encoded packets including at least the first subset of network coding encoded packets that were not successfully received by at least one receiver of the plurality of receivers.

15. The method of claim 14, wherein the second set of network coding encoded packets includes one or more network coding encoded packets generated by the performing of the encoding operation on the plurality of source packets.

16. The method of claim 14, wherein the feedback information further indicates a total quantity of unique network coding encoded packets received by a receiver of the one or more receivers, and wherein the feedback information further indicates that the total quantity of unique network coding network coding encoded packets received by the receiver is less than the decoding threshold.

17. The method of claim 16, wherein the feedback information indicates the total quantity of unique network coding encoded packets received by the receiver based at least in part on stored information associated with a quantity of unique network coding encoded packets previously received by the receiver.

18. The method of claim 14, wherein the feedback information further indicates network coding encoded packets of the first set of network coding encoded packets that were missed by each of the plurality of receivers, and wherein the first subset of network coding encoded packets includes only network coding encoded packets that were missed by each of the plurality of receivers.

19. The method of claim 14, wherein the feedback information further indicates a particular quantity of most frequently missed network coding encoded packets of the first set of network coding encoded packets that were missed by at least one receiver of the plurality of receivers, and wherein the first subset of network coding encoded packets includes no more than the particular quantity of most frequently missed network coding encoded packets.

20. The method of claim 14, wherein the feedback information further indicates a subset of missed network coding encoded packets for each receiver of the plurality of receivers based at least in part on stored information indicating network coding encoded packets previously missed by each receiver of the plurality of receivers.

21. The method of claim 14, wherein the feedback information is first feedback information, and the method further comprises:
receiving second feedback information associated with the second set of network coding encoded packets, the second feedback information indicating that each of the plurality of receivers has received the quantity of network coding encoded packets that satisfies the decoding threshold; and
ceasing broadcasting of network coding encoded packets associated with the plurality of source packets.

22. The method of claim 14, further comprising transmitting an indication of a set of network coding parameters for reception by the plurality of receivers, the set of network coding parameters including one or more parameters associated with generating network coding encoded packets or decoding network coding encoded packets.

23. The method of claim 14, wherein a set of network coding parameters is configured on the transmitter and each receiver of the plurality of receivers, the set of network coding parameters including one or more parameters associated with generating network coding encoded packets or decoding network coding encoded packets.

24. The method of claim 23, further comprising:
receiving a request for a new set of network coding parameters from a receiver of the plurality of receivers; and
transmitting an indication of the set of network coding parameters to the plurality of receivers based at least in part on the request for a new set of network coding parameters.

25. The method of claim 23, further comprising:
receiving a request to switch a used set of network coding parameters from a receiver of the plurality of receivers; and
transmitting an indication to use the set of network coding parameters to the plurality of receivers based at least in part on the request to switch the used set of network coding parameters.

26. The method of claim 14, wherein the feedback information includes channel state information (CSI) report information associated with the first a receiver of the plurality of receivers.

27. A receiver for wireless communication, comprising:
at least one memory; and
at least one processor, coupled with the at least one memory, the at least one processor configured to cause the receiver to:
transmit, to a transmitter, feedback information associated with a first set of network coding encoded packets, the feedback information indicating that the receiver did not successfully receive a quantity of network coding encoded packets that satisfies a decoding threshold associated with recovering a plurality of source packets, the feedback information further indicating a first subset of network coding encoded packets of the first set of network coding encoded packets, each network coding encoded packet in the first subset of network coding encoded packet being not successfully received by one or more respective receivers of a plurality of receivers that include the receiver, the one or more respective receivers not successfully receiving a respective network coding encoded packet in the first subset of network coding encoded packets being the same or different than one or more respective receivers of the plurality of receivers not successfully receiving another network coding encoded packet in the first subset of network coding encoded packets; and
receive, from the transmitter, a second set of network coding encoded packets, the second set of network coding encoded packets including at least the first subset of network coding encoded packets.

28. The receiver of claim 27, wherein the at least one processor is further configured to cause the receiver to determine to include channel state information (CSI) report information, to be used in association with selecting a modulation and coding scheme (MCS), in the feedback information.

29. A method of wireless communication performed by a receiver, comprising:
transmitting, to a transmitter, feedback information associated with a first set of network coding encoded packets, the feedback information indicating that the receiver did not successfully receive a quantity of network coding encoded packets that satisfies a decoding threshold associated with recovering a plurality of source packets, the feedback information further indicating a first subset of network coding encoded packets of the first set of network coding encoded packets, each network coding encoded packet in the first subset of network coding encoded packet being not successfully received by one or more respective receivers of a plurality of receivers that include the receiver, the one or more respective receivers not successfully receiving a respective network coding encoded packet in the first subset of network coding encoded packets being the same or different than one or more respective receivers of the plurality of receivers not successfully receiving another network coding encoded packet in the first subset of network coding encoded packets; and
receive, from the transmitter, a second set of network coding encoded packets, the second set of network coding encoded packets including at least the first subset of network coding encoded packets.

30. The method of claim 29, further comprising determining to include channel state information (CSI) report information, to be used in association with selecting a modulation and coding scheme (MCS), in the feedback information.

* * * * *